(12) United States Patent
Song

(10) Patent No.: US 11,726,368 B2
(45) Date of Patent: Aug. 15, 2023

(54) WAVELENGTH TUNABLE LIQUID CRYSTAL ETALON FILTER INCLUDING DOUBLE SEAL LINE AND MANUFACTURING METHOD OF THE SAME

(71) Applicant: ALBATRACE, INC., Suwon-si (KR)

(72) Inventor: Jang Kun Song, Gwacheon-si (KR)

( * ) Notice: Subject to any disclaimer, the term of this patent is extended or adjusted under 35 U.S.C. 154(b) by 0 days.

(21) Appl. No.: 18/120,468

(22) Filed: Mar. 13, 2023

(65) Prior Publication Data

US 2023/0213819 A1    Jul. 6, 2023

Related U.S. Application Data

(63) Continuation of application No. 17/499,079, filed on Oct. 12, 2021, now Pat. No. 11,630,352.

(30) Foreign Application Priority Data

Oct. 12, 2020    (KR) .......................... 10-2020-0131254

(51) Int. Cl.
*G02F 1/1339* (2006.01)
*G02F 1/21* (2006.01)
(Continued)

(52) U.S. Cl.
CPC .......... *G02F 1/1339* (2013.01); *G02F 1/1341* (2013.01); *G02F 1/133553* (2013.01);
(Continued)

(58) Field of Classification Search
CPC ......... G02F 1/133354; G02F 2203/055; G02F 1/216; G02F 1/133509; G02B 5/284; G02B 6/29367

See application file for complete search history.

(56) References Cited

U.S. PATENT DOCUMENTS

| | | | |
|---|---|---|---|
| 5,111,321 A * | 5/1992 | Patel | G02F 1/216 349/158 |
| 5,592,314 A * | 1/1997 | Ogasawara | G02F 1/13473 356/519 |

(Continued)

FOREIGN PATENT DOCUMENTS

| | | |
|---|---|---|
| JP | 61241730 A | 10/1986 |
| KR | 10-1998-0036758 | 8/1998 |

(Continued)

OTHER PUBLICATIONS

English Specification of 10-2113213.
(Continued)

*Primary Examiner* — Paul C Lee
(74) *Attorney, Agent, or Firm* — Antonio Ha & U.S. Patent, LLC

(57) ABSTRACT

A wavelength-tunable etalon includes a pair of substrates, each comprising a reflection layer, an electrode, and an alignment layer on opposing surfaces of the pair of substrates; a first seal line configured to seal liquid crystal between the pair of substrates; and a second seal line configured to divide a space in which the liquid crystal is sealed into a main liquid crystal accommodating space configured to pass laser and a sub-liquid crystal accommodating space provided external of the main liquid crystal accommodating space. The first seal line comprises a sub inlet configured to fluidly communicate the main liquid crystal accommodating space with the sub-liquid crystal accommodating space.

20 Claims, 21 Drawing Sheets

(51) Int. Cl.
  *G02F 1/1335*    (2006.01)
  *G02F 1/1341*    (2006.01)
  *G02F 1/1343*    (2006.01)
  *G02F 1/1333*    (2006.01)
  *G02F 1/1337*    (2006.01)

(52) U.S. Cl.
  CPC ............ *G02F 1/216* (2013.01); *G02F 1/1337* (2013.01); *G02F 1/13439* (2013.01); *G02F 1/133354* (2021.01); *G02F 2203/055* (2013.01)

(56) References Cited

U.S. PATENT DOCUMENTS

| | | | |
|---|---|---|---|
| 6,545,739 B1 * | 4/2003 | Matsumoto | G02B 6/29358 349/198 |
| 9,207,516 B1 * | 12/2015 | Yu | G02F 1/216 |
| 2018/0017824 A1 * | 1/2018 | Song | H01S 5/141 |

FOREIGN PATENT DOCUMENTS

| | | | | |
|---|---|---|---|---|
| KR | 10-2005-0097727 | | 10/2005 | |
| KR | 10-2113213 | | 5/2020 | |
| WO | WO-9204653 A | * | 3/1992 | ............ G02F 1/216 |

OTHER PUBLICATIONS

English Specification of JP61241730A.
English Specification of 10-2005-0097727.
English Specification of 10-1998-0036758.

* cited by examiner

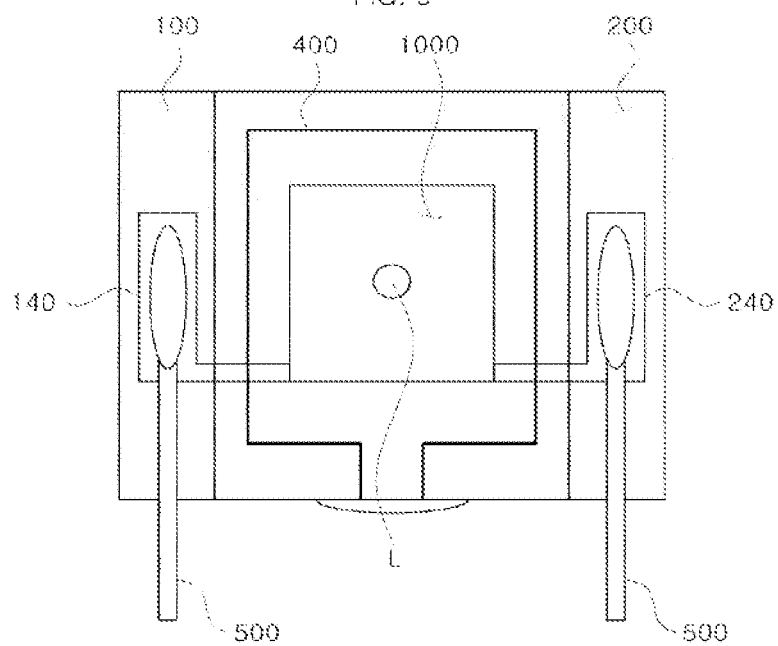
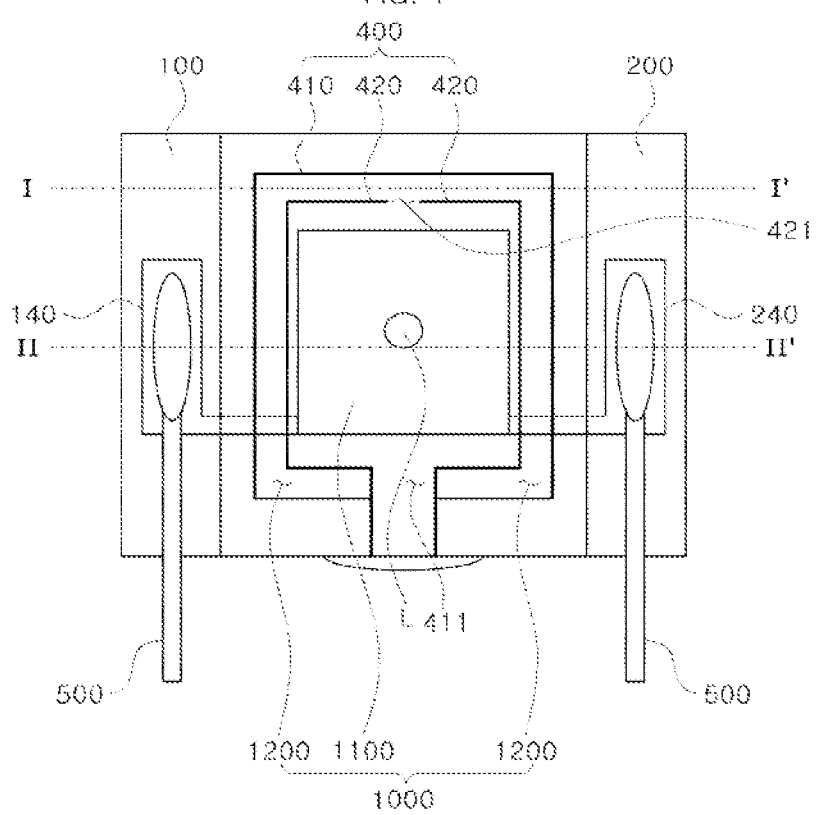

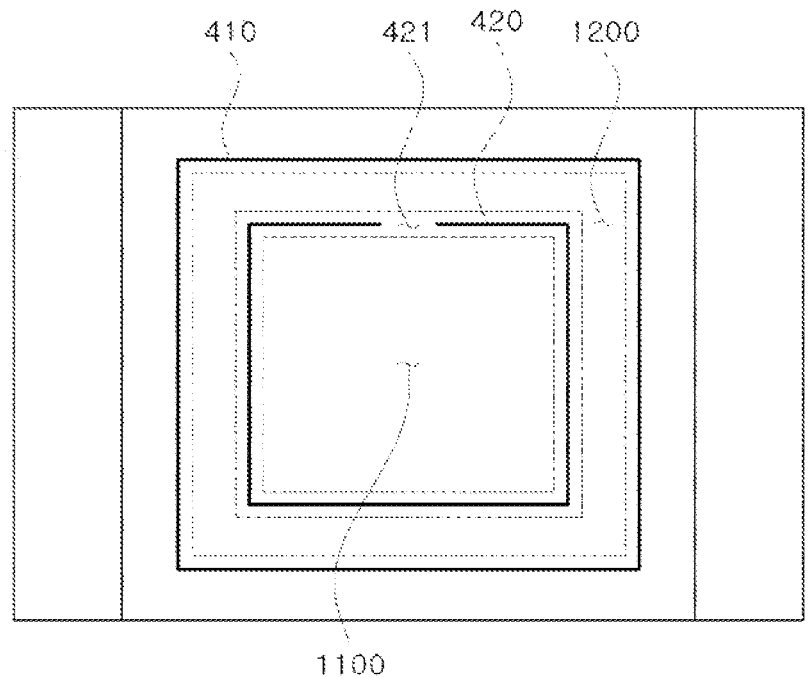
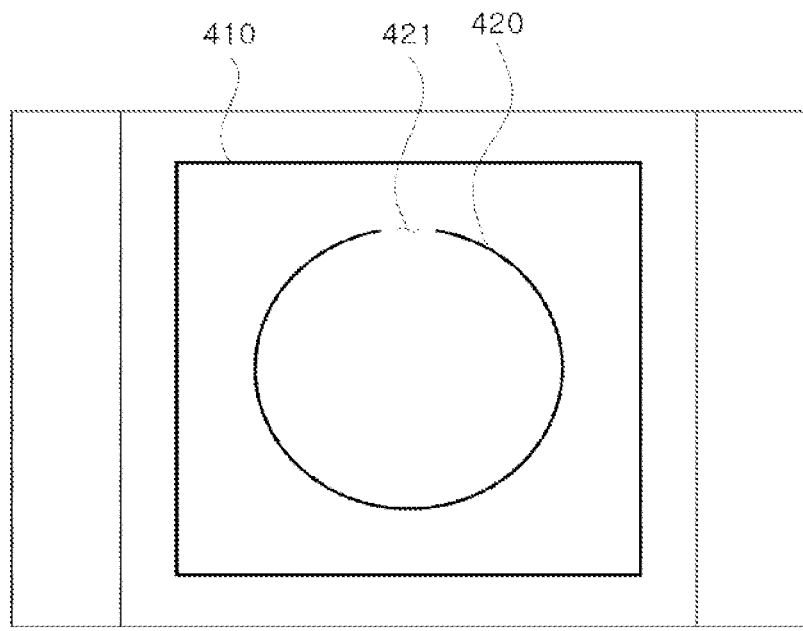

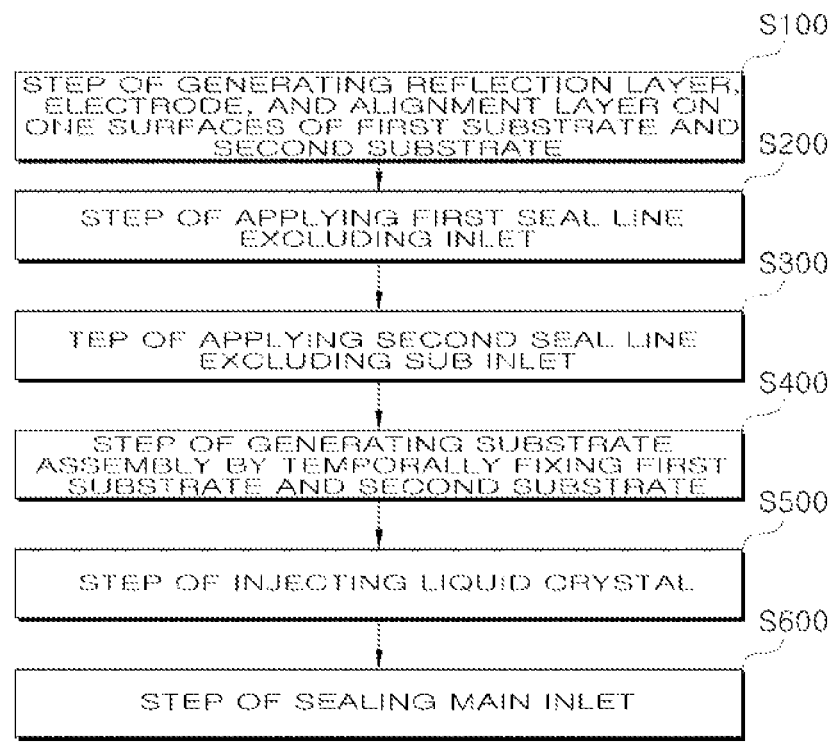
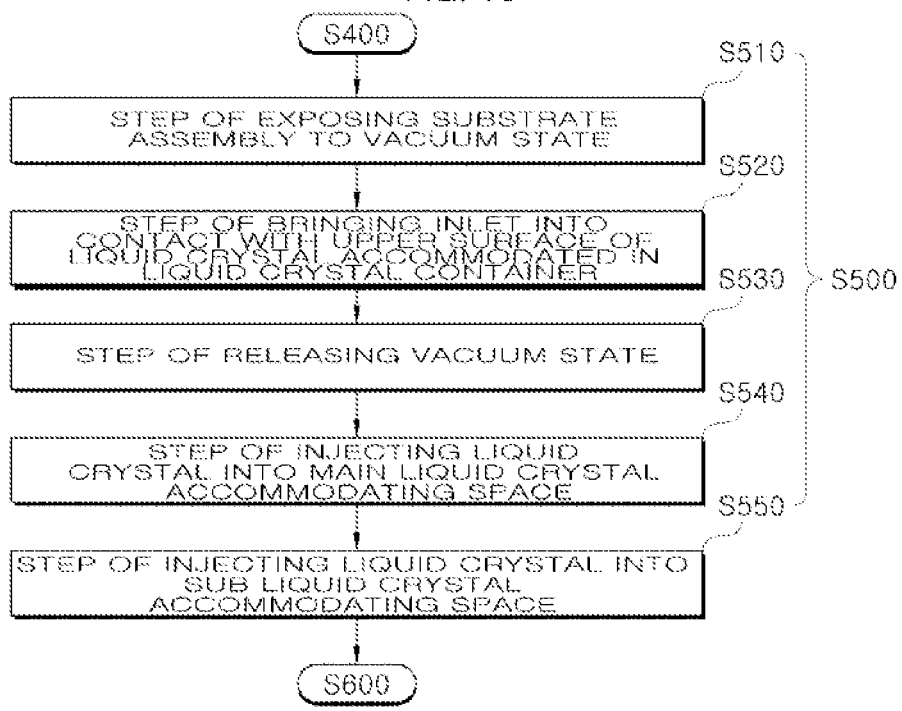

WAVELENGTH TUNABLE LIQUID CRYSTAL ETALON FILTER INCLUDING DOUBLE SEAL LINE AND MANUFACTURING METHOD OF THE SAME

CROSS-REFERENCE TO RELATED APPLICATIONS

This application is a continuation of U.S. patent application Ser. No. 17/499,079, filed on Oct. 12, 2021, which claims the benefit under 35 USC 119(a) of Korean Patent Application No. 10-2020-0131254 filed on Oct. 12, 2020, in the Korean Intellectual Property Office, the disclosures of which are incorporated herein by reference in their entireties.

TECHNICAL FIELD

The present disclosure relates to a wavelength-tunable liquid crystal etalon filter having a double seal line, and more particularly, to a liquid crystal etalon filter which is a wavelength tunable filter component which is used for optical communication.

DESCRIPTION OF THE RELATED ART

Etalon or Fabry-Perot interferometer is an optical component. When two substrates, including a reflector, are installed in parallel to be close to each other, it transmits only light having a specific wavelength among light from two parallel mirror surfaces due to the interference phenomenon by multi-reflection. The etalon is an optical component frequently used for optical communication and has advantages of high efficiency and high wavelength selectivity. Specifically, the etalon is used for a wavelength-tunable semiconductor laser, including an external cavity.

At this time, a liquid crystal layer is included in the etalon cavity to modulate a refractive index according to an applied voltage to electrically modulate a selected wavelength. This is called a liquid crystal etalon filter and in this regard, U.S. Pat. No. 5,150,236 is disclosed.

However, the wavelength-tunable etalon of the related art has a problem in that a characteristic of liquid crystal filled therein is deteriorated or deformed due to an external impact such as a pressure or a temperature so that the performance cannot be maintained.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a wavelength-tunable etalon includes a pair of substrates, each comprising a reflection layer, an electrode, and an alignment layer on opposing surfaces of the pair of substrates; a first seal line configured to seal liquid crystal between the pair of substrates; and a second seal line configured to divide a space in which the liquid crystal is sealed into a main liquid crystal accommodating space configured to pass laser and a sub-liquid crystal accommodating space provided external of the main liquid crystal accommodating space. The first seal line comprises a sub inlet configured to fluidly communicate the main liquid crystal accommodating space with the sub-liquid crystal accommodating space.

The first seal line may further include a main inlet configured to inject the liquid crystal into the main liquid crystal accommodating space and the sub-liquid crystal accommodating space when the pair of substrates may be coupled to the first seal line.

The main inlet and the sub inlet may be formed in different directions at a center of a plane of the substrate.

Both sides of the second seal line may be connected to two ends of the first seal line.

The main liquid crystal accommodating space may be configured to be larger than the sub-liquid crystal accommodating space.

The second seal line may be configured such that the sub-liquid crystal accommodating space has a circle, a rectangle, or a square contour.

The second seal line may further include at least one protrusion extending to the sub-liquid crystal accommodating space with a predetermined length.

The first seal line may be configured to form a closed path.

A space between the first seal line and the second seal line may be a vacuum or may include air bubbles.

Portions of the second seal line may be formed spaced apart within the first seal line.

The second seal line may be configured such that the sub-liquid crystal accommodating space has a circle, a rectangle, or a square contour.

The second seal line may further include at least one protrusion extending to the sub-liquid crystal accommodating space with a predetermined length.

The wavelength-tunable etalon may further include a third seal line connecting one side of the second seal line and one side of the first seal line. The third seal line may be spaced apart from the sub inlet.

In another general aspect, a manufacturing method of a wavelength-tunable etalon, includes: generating a reflection layer, an electrode, and an alignment layer on a surface of a first substrate and a surface of a second substrate; applying a first seal line on the surface of the first substrate along a boundary of a sub-liquid crystal accommodating space excluding a main inlet; applying a second seal line on the surface of the first substrate along a boundary of a main liquid crystal accommodating space and the sub-liquid crystal accommodating space excluding a sub inlet within a boundary of the first seal line; generating a substrate assembly by aligning the second substrate and the first substrate; sequentially injecting liquid crystal through the main inlet into the main liquid crystal accommodating space and the sub-liquid crystal accommodating space; and sealing the main inlet.

The sub inlet may be formed spaced apart from the main inlet.

Both sides of the second seal line may be connected to ends of the first seal line adjacent to the main inlet.

The injecting of the liquid crystal may include exposing the substrate assembly to a vacuum state; bringing the main inlet into contact with an upper surface of the liquid crystal accommodated in a liquid crystal container; and injecting the liquid crystal into the main liquid crystal accommodating space and the sub-liquid crystal accommodating space by releasing the vacuum state.

In another general aspect, a manufacturing method of a wavelength-tunable etalon, includes generating a reflection layer, an electrode, and an alignment layer on a surface of a first substrate and a surface of a second substrate; applying a first seal line on the surface of the first substrate along a closed path to form a sub-liquid crystal accommodating space therein; applying a second seal line on the surface of the first substrate along a boundary of a main liquid crystal accommodating space and the sub-liquid crystal accommodating space excluding a sub inlet within a boundary of the first seal line; injecting liquid crystal in the main liquid crystal accommodating space; and aligning and fixing the second substrate to the first substrate.

During the fixing, when the first substrate and the second substrate may be in close contact with each other, the liquid crystal may move to the sub-liquid crystal accommodating space from the main liquid crystal accommodating space through the sub inlet.

During the applying of the second seal line, the second seal line may be applied to exclude contacting the first seal line.

The manufacturing method may further include, before the applying of liquid crystal, forming a third seal line connecting one side of the second seal line and one side of the first seal line.

Other features and aspects will be apparent from the following detailed description, the drawings, and the claims.

BRIEF DESCRIPTION OF DRAWINGS

FIG. 3 is a plan view of a wavelength-tunable etalon illustrated in FIG. 2.

FIG. 4 is a plan view of an etalon filter according to a first embodiment of the present disclosure.

FIGS. 14A, 14B, 14C, and 14D are conceptual views of a wavelength-tunable etalon according to a second embodiment of the present disclosure.

FIG. 17 is a flowchart of a manufacturing method of a wavelength-tunable etalon according to a third embodiment of the present disclosure.

FIG. 18 is a detailed flowchart of an operation of injecting liquid crystal according to the third embodiment.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
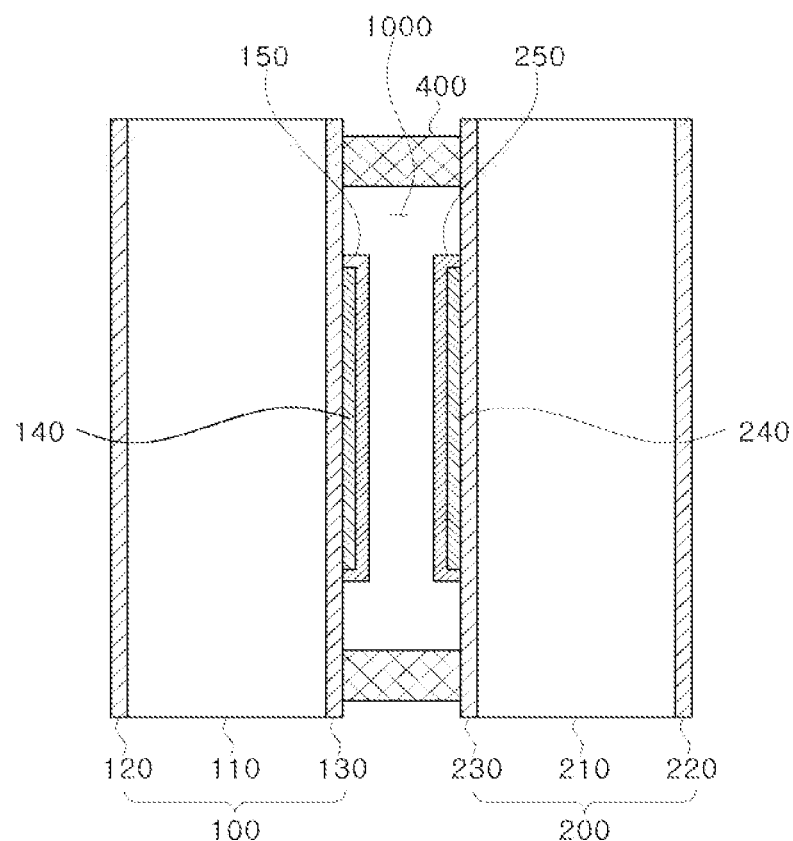
FIG. 1 is a cross-sectional view of a wavelength-tunable etalon of the related art.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

Hereinafter, a wavelength-tunable structure of the related art will be described with reference to FIGS. 1 and 2.

FIG. 1 is a cross-sectional view of a wavelength-tunable etalon 1 of the related art.

FIG. 1 is a cross-sectional view of the existing etalon 1 cell. As illustrated in the drawing, the etalon 1 includes a first substrate 100, a second substrate 200, and a seal line 400.

The first substrate 100 includes a first low reflection layer 120 (antireflection coating), a first motherboard 110, a first reflection coating layer 130 (high reflection coating).

The first low reflection layer 120 may be provided on a first outside surface outside the first motherboard 110. The first reflection coating layer 130 may be provided on a first inside surface which is an inside surface of the first motherboard 110. Here, the first motherboard 110 refers to a plate including a colorless and transparent material such as glass or crystal. As the first reflection coating layer 130, a dielectric reflection layer (dielectric mirror) formed by laminating a dielectric layer may be generally used, and a reflectance thereof may be 95% or higher. The first reflection coating layer 130 may be formed to have a thickness of several µm to several mm.

The second substrate 200 is symmetrically configured to correspond to the first substrate 100. Specifically, the second substrate 200 may include a second low reflection layer 220 on a second outside surface outside the second motherboard 210 and a second reflection coating layer 230 on the inside surface.

The first substrate 100 and the second substrate 200 are coupled with a predetermined interval therebetween such that the first reflection coating layer 130 and the second reflection coating layer 230 are opposite to each other.

A seal line 400 is provided on an inside surface to maintain a predetermined interval between the first substrate 100 and the second substrate 200.

The etalon 1 may be rectangular as seen from a front side, and generally, the etalon may be manufactured to have a size of 1 cm or smaller in width and length.

A laser passing area L through which laser beam passes may be determined as a center portion of the etalon 1. The laser beam may be filtered depending on the state of the liquid crystal 300 in the laser passing area L.

To suppress the optical scatterability of the liquid crystal (300) etalon filter 1, a spacer is not formed in the liquid crystal accommodating space 1000. Therefore, the uniformity of a cell gap is significantly affected by the seal line, and the impact resistance against the impact, such as an external temperature or pressure, is also significantly affected by the shape of the seal line.

Figure 2:
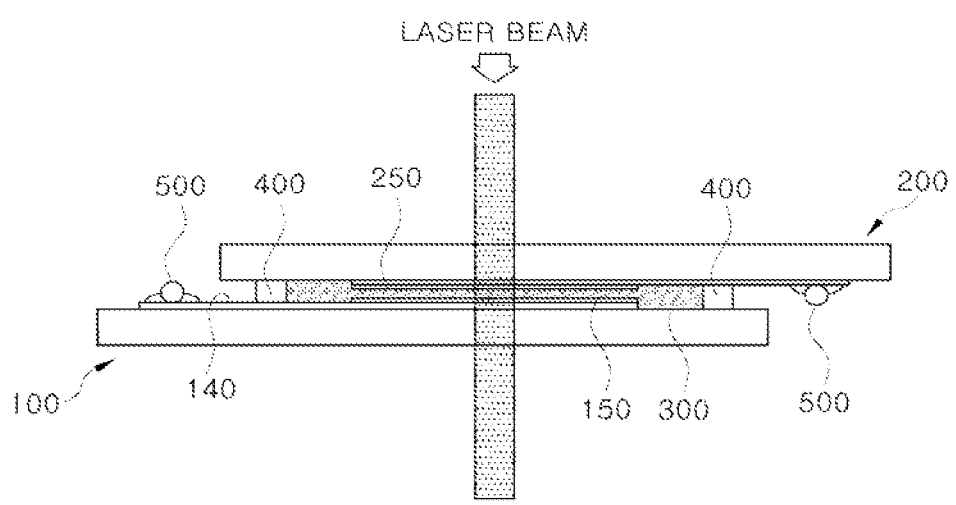
FIG. 2 is a cross-sectional view of another example of a wavelength-tunable etalon of the related art.

FIG. 2 is a cross-sectional view of another example of a wavelength-tunable etalon 1 of the related art and FIG. 3 is a plan view of a wavelength-tunable etalon 1 illustrated in FIG. 2.

Unlike the above-described etalon 1 of the related art, FIG. 2 illustrates that the first substrate 100 and the second substrate 200 are configured to be displaced from each other. In this case, even though the first substrate 100 and the second substrate 200 have the same size, it may be easily accessible to a space for connecting an external wire at one side.

In the meantime, a liquid crystal (300) layer is provided between the first substrate 100 and the second substrate 300, and the operating principle may be the same as the above described embodiment.

Referring to FIG. 3, it is confirmed that liquid crystal 300 is injected into a center portion of the etalon by the seal line, and a laser passing area L is formed.

Hereinafter, the etalon filter 1, according to a first embodiment of the present disclosure, will be described in detail with reference to FIGS. 4 to 13. A configuration of the etalon filter 1, which is the above-described related art, may be included in one or more embodiments, but redundant descriptions for the same component will be omitted. In contrast, different configurations will be described in detail.

Figure 5A:
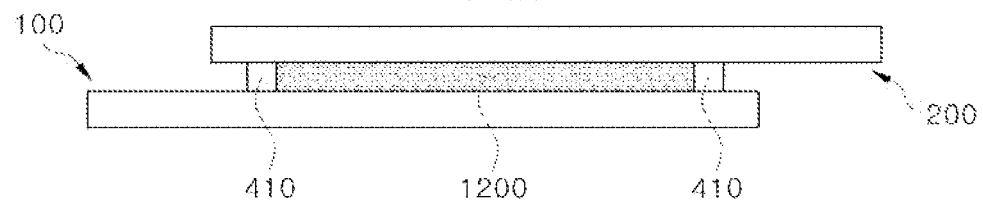
FIGS. 5A and 5B are cross-sectional views taken along the lines I-I' and II-II' of FIG. 4.
Figure 5B:
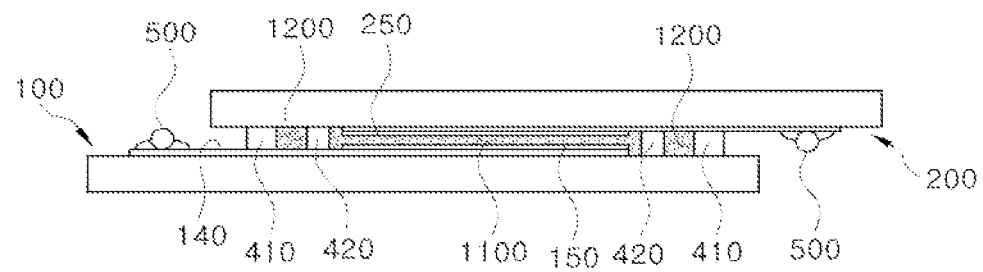

FIG. 4 is a plan view of an etalon filter 1 according to a first embodiment of the present disclosure and FIGS. 5A and 5B are cross-sectional views taken along the lines I-I' and II-II' of FIG. 4.

As illustrated in the drawings, the etalon filter 1, according to the first embodiment of the present disclosure, may be configured such that the seal line includes a first seal line 410 and a second seal line 420.

The first seal line 410 and the second seal line 420 are provided between the first substrate 100 and the second substrate 200 to form a liquid crystal accommodating space 1000.

The first seal line 410 may be formed in an area excluding a main inlet 411 to define a space where liquid crystal 300 is injected along a planar direction of the first substrate 100. When the main inlet 411 is sealed after injecting the liquid crystal 300 into the liquid crystal accommodating space 1000, the liquid crystal 300 injected between the first substrate 100 and the second substrate 200 may be fixed by the first seal line 410. Herein, it is noted that use of the term 'may' with respect to an example or embodiment, e.g., as to what an example or embodiment may include or implement, means that at least one example or embodiment exists where such a feature is included or implemented while all examples and embodiments are not limited thereto.

The main liquid crystal accommodating space 1100 and a sub-liquid crystal accommodating space 1200 may be formed inside the first seal line 410.

The main liquid crystal accommodating space 1100 is an area in which the laser passing area L is defined. The sub-liquid crystal accommodating space 1200 is configured to fluidly communicate with the main liquid crystal accommodating space 1100 to constantly maintain an amount of the liquid crystal 300 accommodated in the main liquid crystal accommodating space 1100 when a thermal impact or a pressure is generated. By doing this, the liquid crystal 300 flows.

The second seal line 420 is configured to distinguish the main liquid crystal accommodating space 1100 from the sub-liquid crystal accommodating space 1200. The second seal line 420 is provided in the liquid crystal accommodating space 1000 formed by the first seal line 410 and may be formed along a path which encloses the laser passing area L. The second seal line 420 may be formed along a predetermined path with one side which is cut, that is, a part which is omitted, and the omitted part may serve as a sub inlet 421 for fluidal communication between the main liquid crystal accommodating space 1100 and the sub-liquid crystal accommodating space 1200.

Referring to FIG. 4 again, the second seal line 420 extends upwardly from both sides of the first seal line 410 provided at a lower side in FIG. 4 with a predetermined length to allow the laser passing area L to be disposed therein and extends to be close to each other at an upper side. Finally, one pair of second seal lines 420 is not connected to each other and a part thereof is open.

In the meantime, according to the present embodiment, the liquid crystal 300 is injected in a state in which the first substrate 100 and the second substrate 200 are fixed to each other by the first seal line 410 and the second seal line 420. At this time, the liquid crystal 300 is started to be injected through the main inlet 411 from the outside. The liquid crystal 300, which passes through the main inlet 411, is injected into the main liquid crystal accommodating space 1100 first and then passes through the sub inlet 421 to be injected into the sub-liquid crystal accommodating space 1200. Thereafter, the liquid crystal 300 is filled from a space close to the sub inlet 421 of the sub-liquid crystal accommodating space 1200.

Figure 6A:
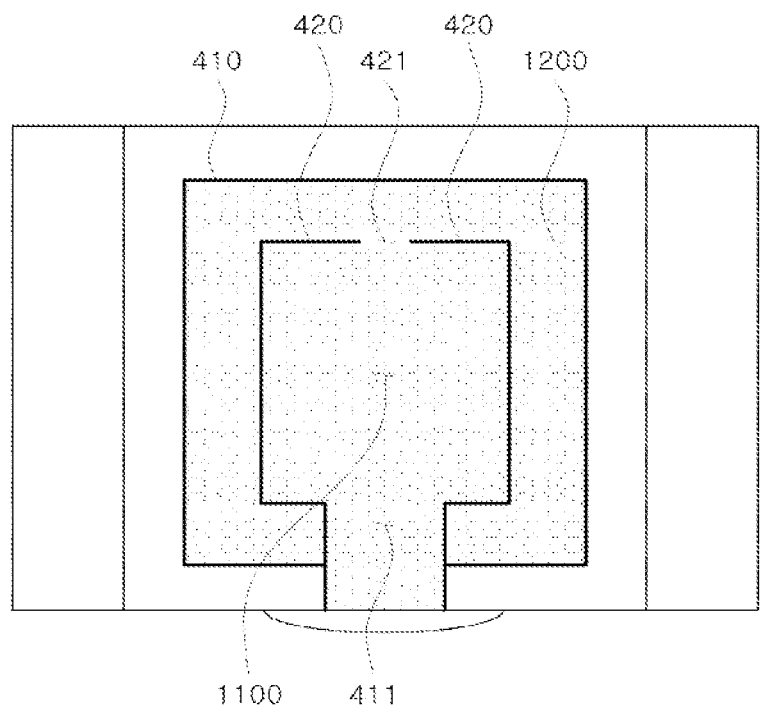
FIGS. 6A, 6B, and 6C are conceptual views illustrating a state of a liquid crystal according to the amount of remaining air of an etalon filter according to a first embodiment.
Figure 6B:
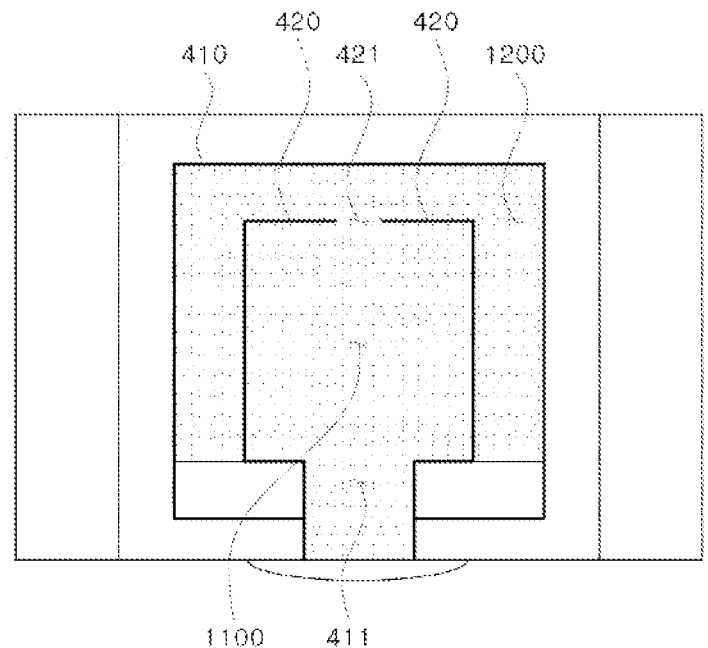
Figure 6C:
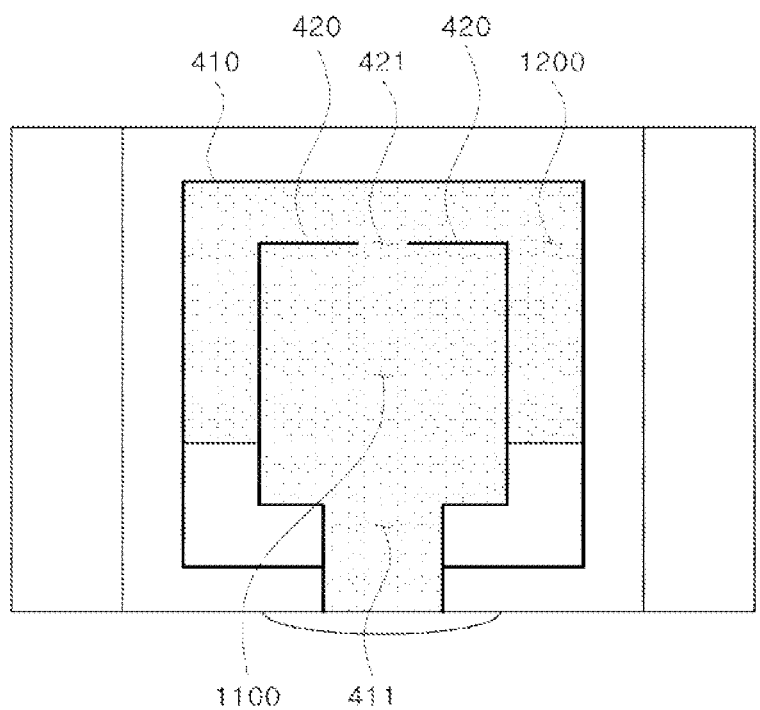

FIGS. 6A to 6C are conceptual views illustrating a state of a liquid crystal 300 according to the amount of remaining air of an etalon filter 1 according to a first embodiment. For the convenience of description, an electrode 140, an alignment layer 150, and a wire 500 are omitted in the following drawings, and the seal line and the liquid crystal accommodating space 1000 are emphasized.

Referring to FIG. 6, as described with reference to FIG. 4, the liquid crystal 300 is injected into the main liquid crystal accommodating space 1100 and the sub-liquid crystal accommodating space 1200 utilizing the main inlet 411. Therefore, even though residual air or vacuum V remains in the liquid crystal accommodating space 1000, the residual air or vacuum may be located concentratedly at the outermost of the sub-liquid crystal accommodating space 1200. Therefore, even though an amount of the liquid crystal 300 is insufficient, it does not affect the main liquid crystal accommodating space 1100 in which the laser passing area L is formed. In the meantime, the main liquid crystal accommodating space 1100 may be larger than the sub-liquid crystal accommodating space 1200. Therefore, the influence on the laser passing area L due to the presence of the sub-liquid crystal accommodating space 1200 may be minimized.

Figure 7:
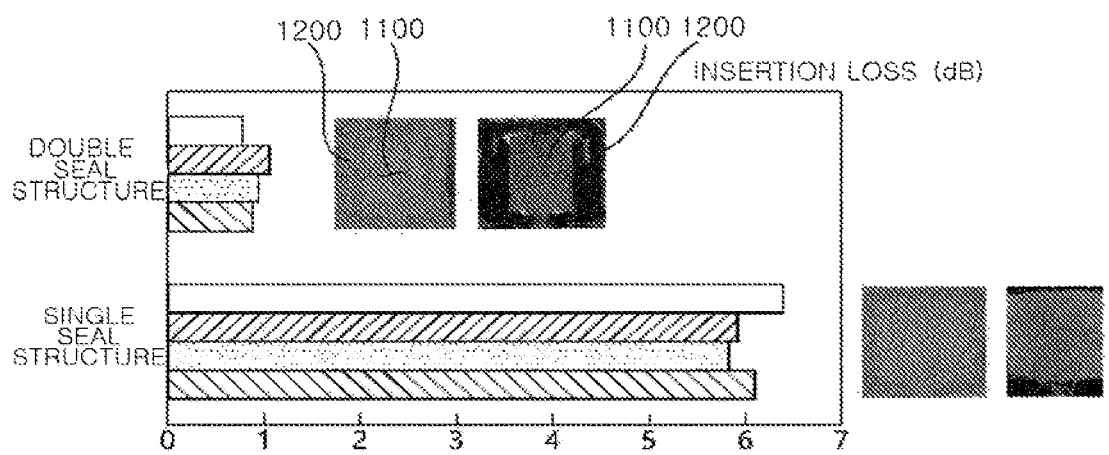
FIG. 7 is a graph comparing an insertion loss of an etalon filter according to a first embodiment due to a thermal impact with that of an etalon of the related art.

FIG. 7 is a graph comparing an insertion loss of an etalon filter 1, which is a first embodiment due to a thermal impact with that of an etalon 1 of the related art.

Referring to FIG. 7, an insertion loss value measured after applying a thermal impact by performing a thermal treatment on the etalon filter 1 having a single seal line of the related art and the first embodiment of the present disclosure having a double seal line for 12 hours at 120 degrees is specifically illustrated. An insertion loss of the etalon filter 1 having a single seal line of the related art is approximately 5.7 to 6.5 dB. An insertion loss of the first embodiment of the present disclosure is 0.75 to 1.1 dB; therefore, it is confirmed that the insertion loss is significantly reduced. Further, the change of the liquid crystal (300) accommodating state according to the thermal impact may also be confirmed. In the etalon filter 1 of the related art, the liquid crystal (300) accommodating state is affected in the entire liquid crystal accommodating space 1000. In contrast, according to the first embodiment of the present disclosure, some of liquid crystal 300, which is accommodated in the sub-liquid crystal accommodating space 1200 moves to the main liquid crystal accommodating space 1100 according to the thermal impact of the liquid crystal accommodating space 1000 to minimize the change of the liquid crystal (300) accommodating state of the main liquid crystal accommodating space 1100.

Figure 8:
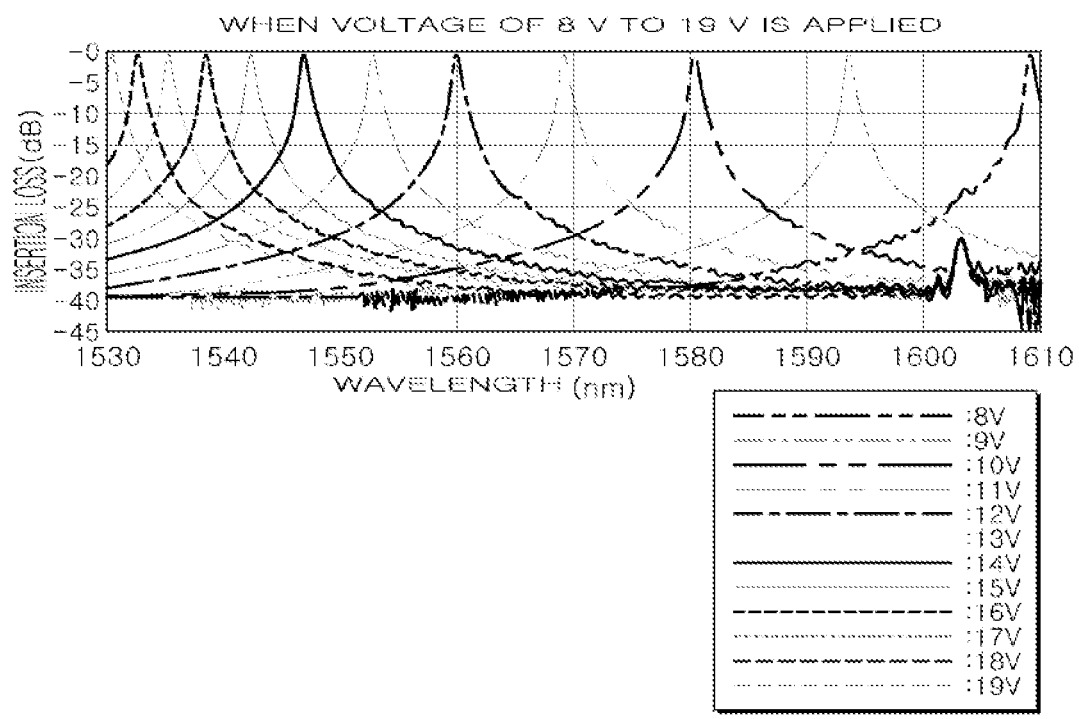
FIG. 8 is a graph illustrating a transmission spectrum of an etalon filter according to a first embodiment.

FIG. 8 is a graph illustrating a transmission spectrum of an etalon filter 1 according to a first embodiment.

Referring to FIG. 8, in the first embodiment, according to the present disclosure, a transmission spectrum when the voltage is adjusted by 1 V from 8 to 19 V is illustrated, and it is confirmed that a laser with a desired wavelength may be filtered according to the voltage.

Figure 9A:
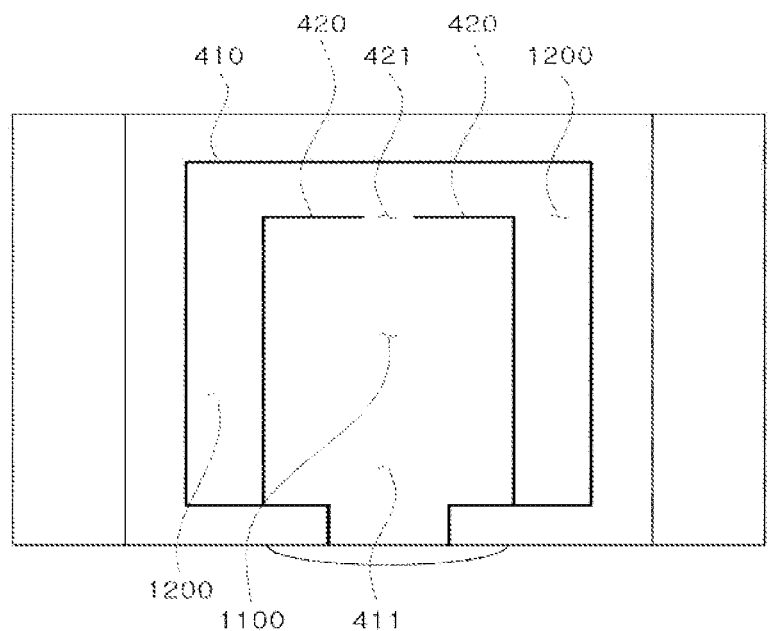
FIGS. 9A and 9B are conceptual views illustrating a seal line of a wavelength-tunable etalon according to a modified example of the first embodiment.
Figure 9B:
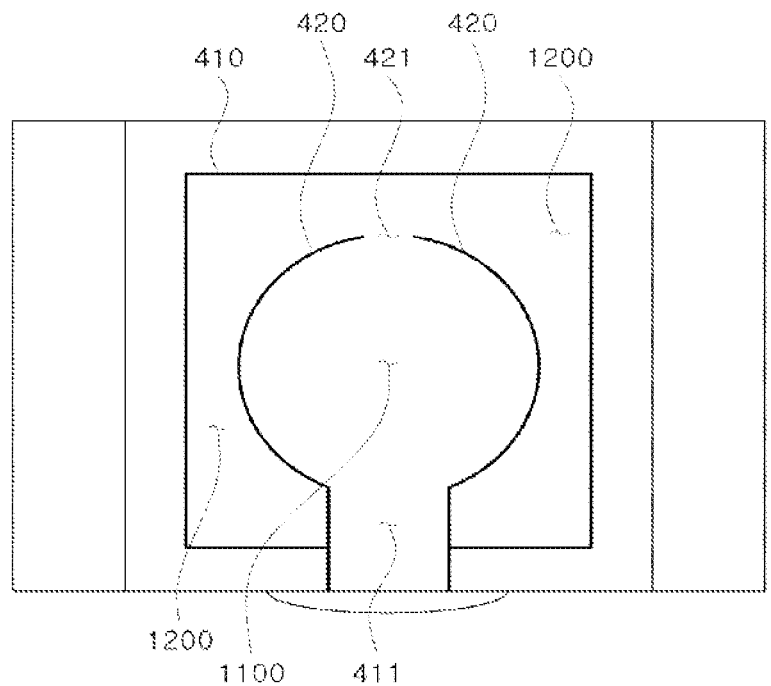

FIGS. 9A and 9B are conceptual views illustrating a seal line of a wavelength-tunable etalon 1 according to a modified example of the first embodiment.

Referring to FIGS. 9A and 9B, in the first embodiment according to the present disclosure, the second seal line 420 may be modified in various forms. For example, the second seal line 420 extends to a predetermined length at two points adjacent to the first seal line 410, which forms the main inlet 411 and then encloses the laser passing area along a rectangular path, and a sub inlet 421 may be formed at points spaced apart from each other to be opposite to the main inlet 411 (FIG. 9A). Further, the second seal line 420 may also be formed along a circular path (see FIG. 9B), and also in this case, the sub inlet 421 may be formed at points spaced apart from each other to be opposite to the main inlet 411.

Figure 10A:
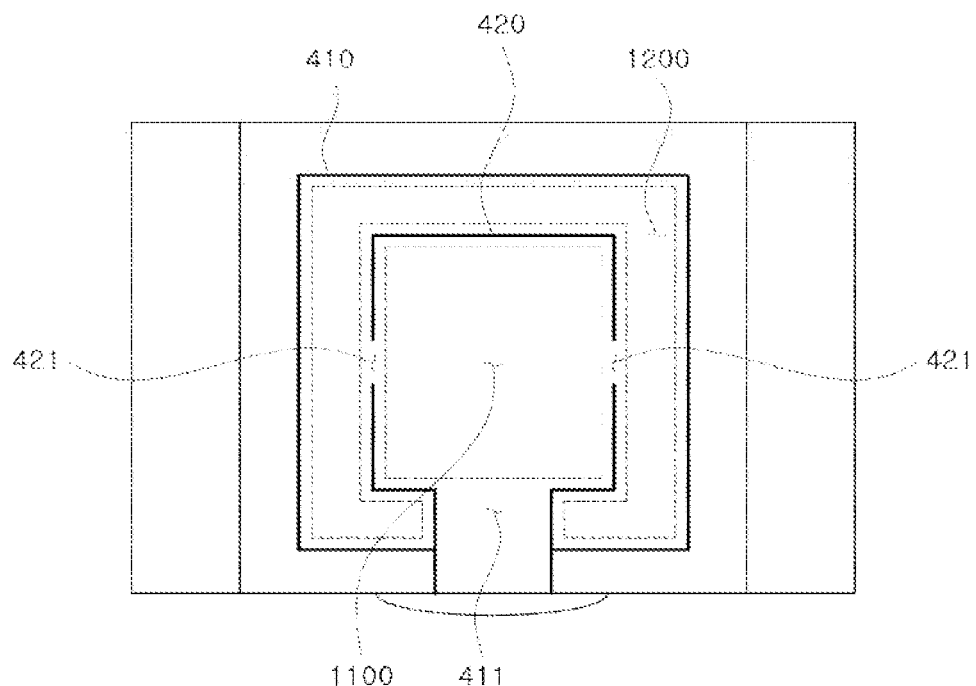
FIGS. 10A to 10C are conceptual views illustrating another modified example of the first embodiment.
Figure 10B:
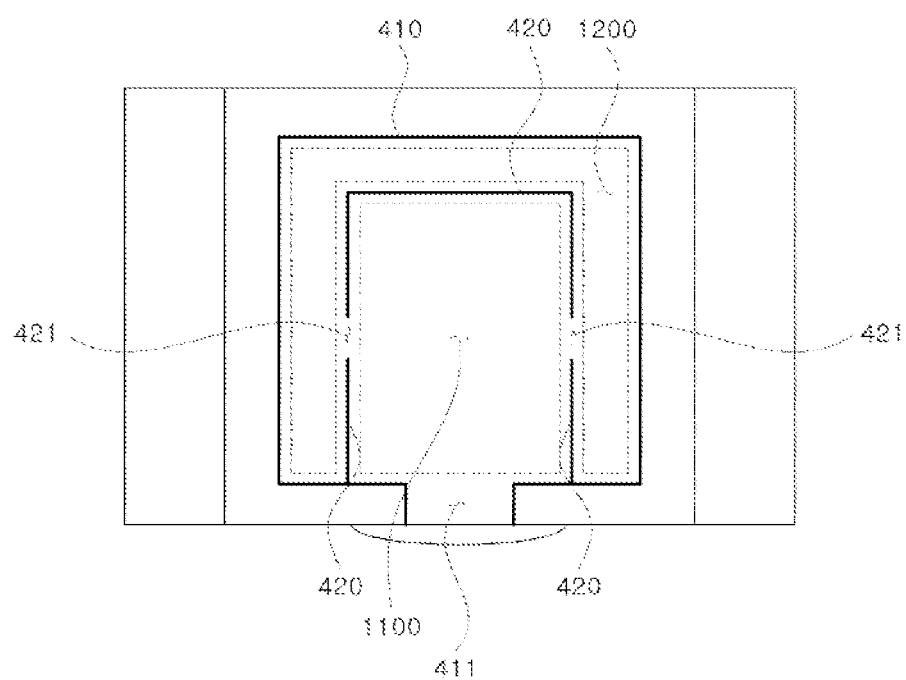
Figure 10C:
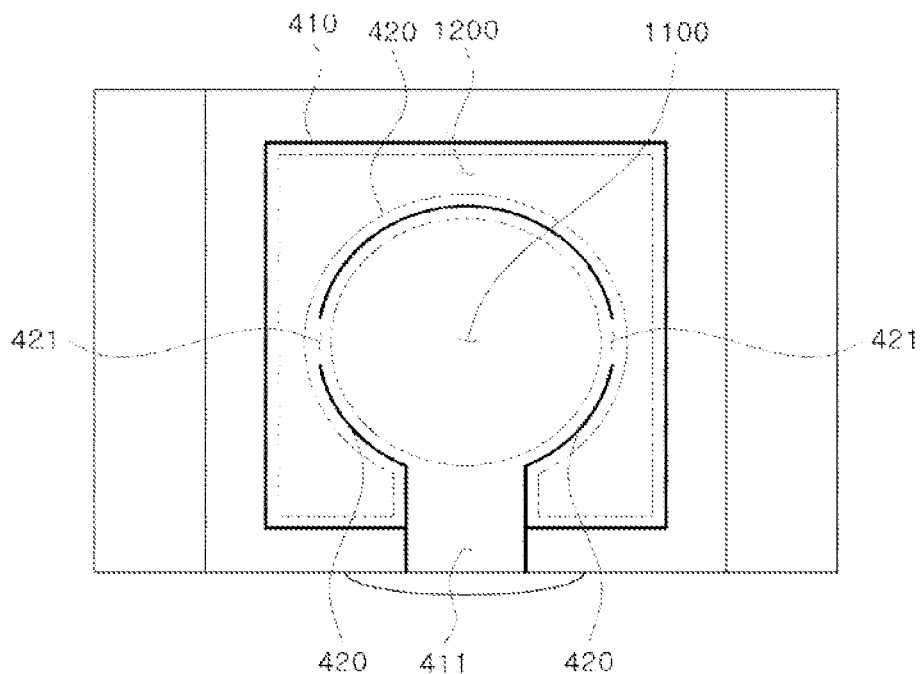

FIGS. 10A to 10C are conceptual views illustrating another modified example of the first embodiment.

Referring to FIGS. 10A to 10C, unlike the modified example of the first embodiment described with reference to FIGS. 9A and 9B, a modified example in which a pair of sub-inlets 421 is configured is illustrated. One pair of sub-inlets 421 may be formed to be perpendicular to the main inlet 411 with respect to the laser passing area L. As a result, also in the modified example of the first embodiment illustrated in FIG. 10, when the liquid crystal 300 is injected, the liquid crystal 300 which passes through the main inlet 411 is filled in the main liquid crystal accommodating space 1100 and then is injected into the sub-liquid crystal accommodating space 1200.

Figure 11A:
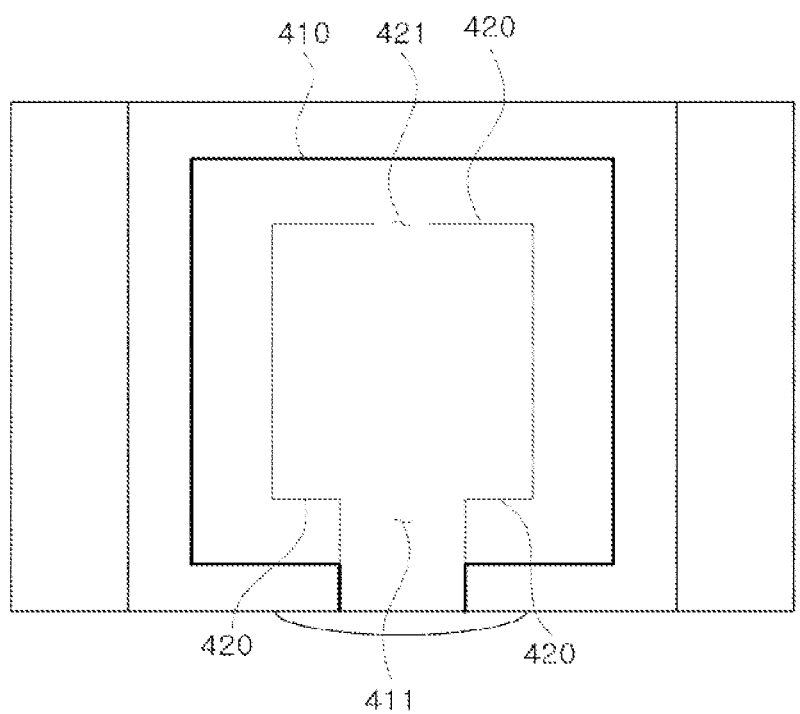
FIGS. 11A, 11B, and 11C are conceptual views illustrating still another modified example of the first embodiment.
Figure 11B:
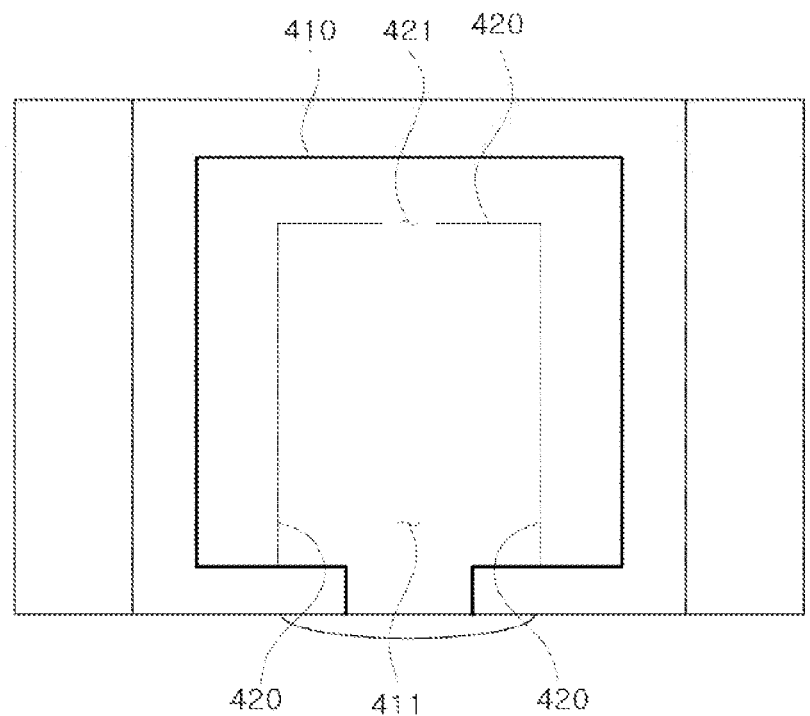
Figure 11C:
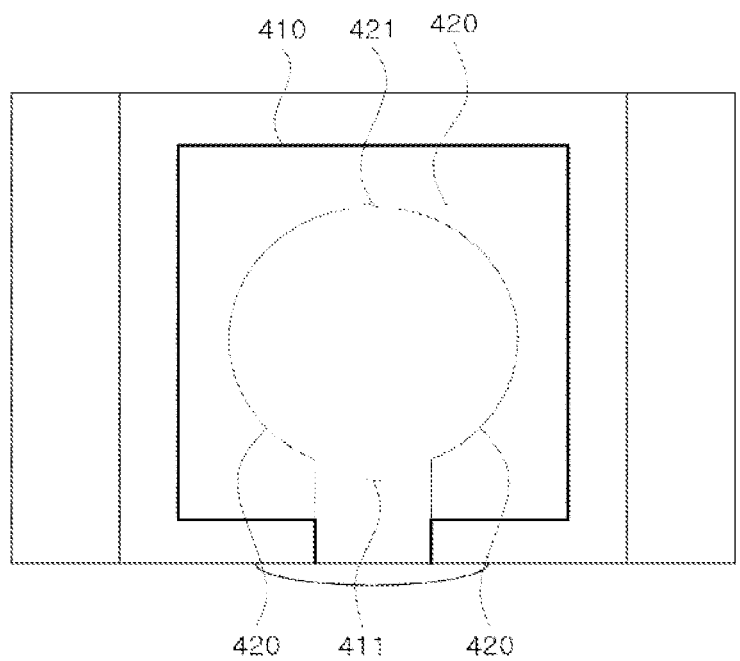

FIGS. 11A to 11C are conceptual views illustrating still another modified example of the first embodiment.

Referring to FIGS. 11A to 11C, in the embodiment, the shape of the second seal line 420 is the same as that of the above-described modified example, but the thickness of the second seal line 420 may be different. Here, a thickness refers to a thickness in a planar direction: a width of the second seal line 420. In the meantime, even in the modified example, the thickness of the seal line between the first substrate 100 and the second substrate 200 is configured to be the same as the above-described embodiment so that the flowing of the liquid crystal 300, which passes through the second seal line 420 is still suppressed.

The second seal line 420 determines a flowing direction of the liquid crystal 300 in the liquid crystal accommodating space 1000 and is irrelevant to the leakage of the liquid crystal 300 to the outside. Therefore, the second seal line 420 may be configured to have a thickness smaller than that of the first seal line 410, which suppresses the leakage of the liquid crystal 300 to the outside.

Even though not illustrated, the second seal line 420 may be configured to have a larger width than the first seal line 410.

Figure 12A:
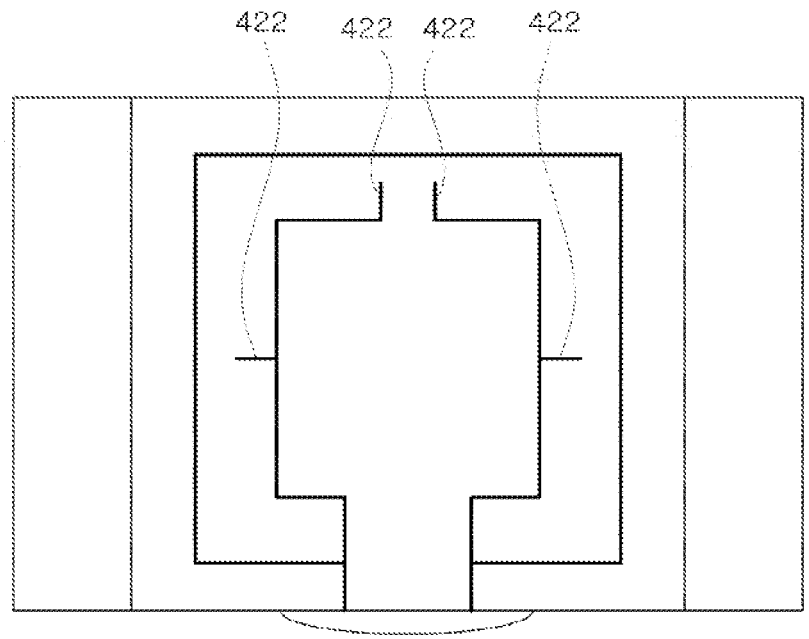
FIGS. 12A, 12B, and 12C are conceptual views illustrating a modified example in which a protrusion is added to the first embodiment.
Figure 12B:
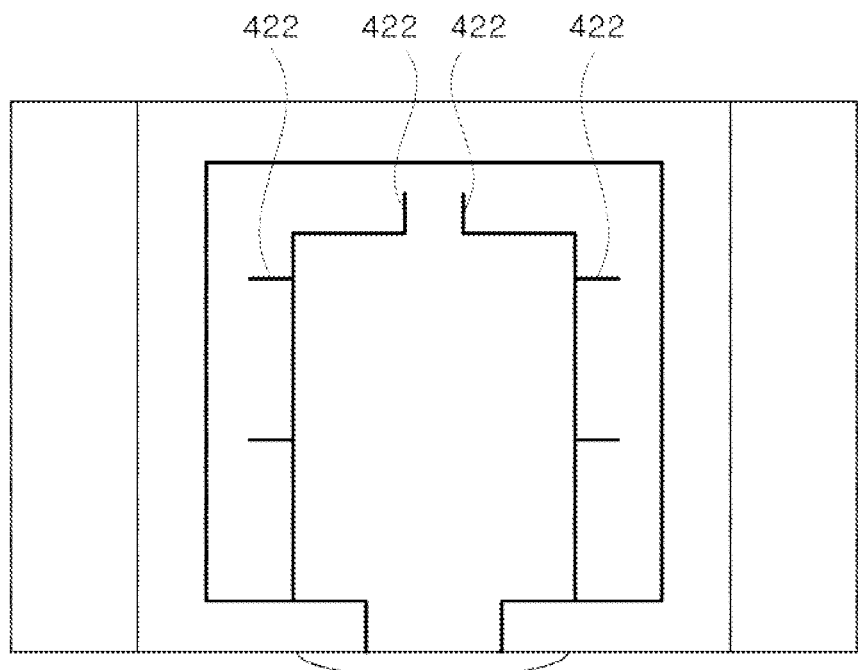
Figure 12C:
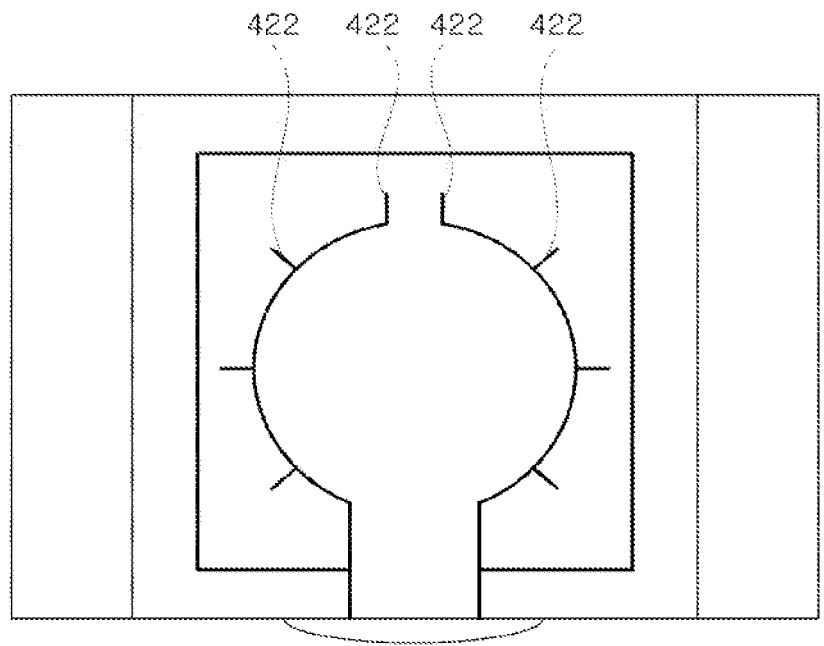

FIGS. 12A to 12C are conceptual views illustrating a modified example in which a protrusion 422 is added to the first embodiment.

Referring to FIGS. 12A to 12C, according to the first embodiment, a protrusion 422 which extends to the sub-liquid crystal accommodating space 1200 with a predetermined length may be provided in the second seal line 420. In addition, a plurality of protrusions 422 may be provided, and the protrusions divide the sub-liquid crystal accommodating space 1200 into a plurality of spaces to help accommodate the liquid crystal 300.

Figure 13A:
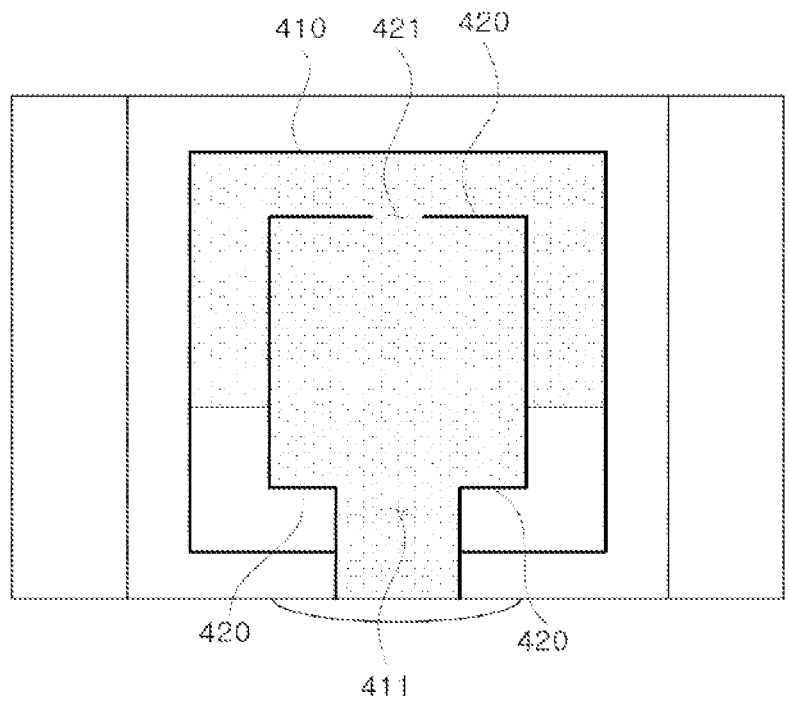
FIGS. 13A, 13B, and 13C are conceptual views illustrating a liquid crystal state according to a shape of a second seal line in the first embodiment.
Figure 13B:
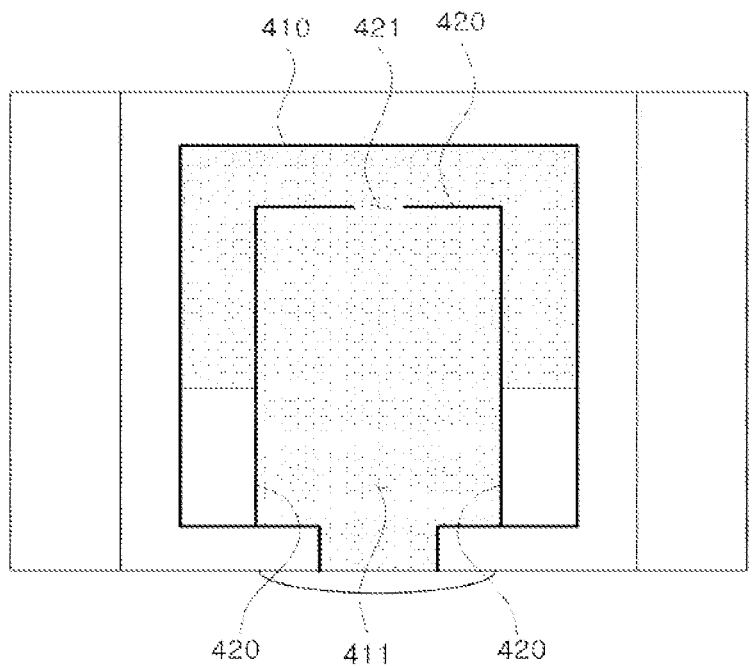
Figure 13C:
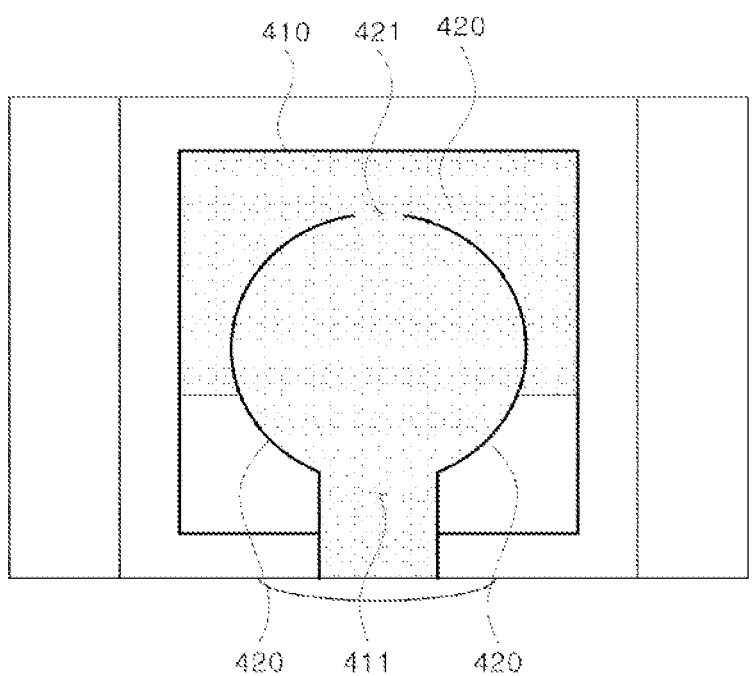

FIGS. 13A to 13C are conceptual views illustrating a liquid crystal (300) state according to the shape of the second seal line 420 in the first embodiment.

Referring to FIGS. 13A to 13C, when the second seal line 420 is formed to have a rectangular shape (FIGS. 13A and 13B) and have a circular shape (FIG. 13C), the liquid crystal 300 is fully filled in the main liquid crystal accommodating space 1100 and the remaining liquid crystal 300 is filled in the sub-liquid crystal accommodating space 1200. At this time, even though the thermal impact or the external pressure is applied, the amount of liquid crystal 300 injected into the main liquid crystal accommodating space 1100 is maintained to maintain a filtering performance.

Hereinafter, a wavelength-tunable etalon 1, according to a second embodiment of the present disclosure, will be described in detail with reference to FIGS. 14 to 16. In the meantime, the present embodiment may be configured to include the same components as the first embodiment. Therefore, a redundant description for the same components will be omitted, and only the different configurations will be described.

FIGS. 14A to 14D are conceptual views of a wavelength-tunable etalon 1 according to a second embodiment of the present disclosure.

Referring to FIGS. 14A to 14D, the wavelength-tunable etalon 1 in the present embodiment may be formed by dropping the liquid crystal 300. In this case, an appropriate amount of liquid crystal 300 is dropped in a state in which the first seal line 410 and the second seal line 420 are applied on the inner surface of the first substrate 100. The second substrate 200 is brought into close contact with the first substrate 100 to fix the first substrate 100 and the second substrate 200. In the present disclosure, the liquid crystal 300 is dropped so that the main inlet 411 is omitted and only the sub inlet 421 is formed.

Figure 14C:
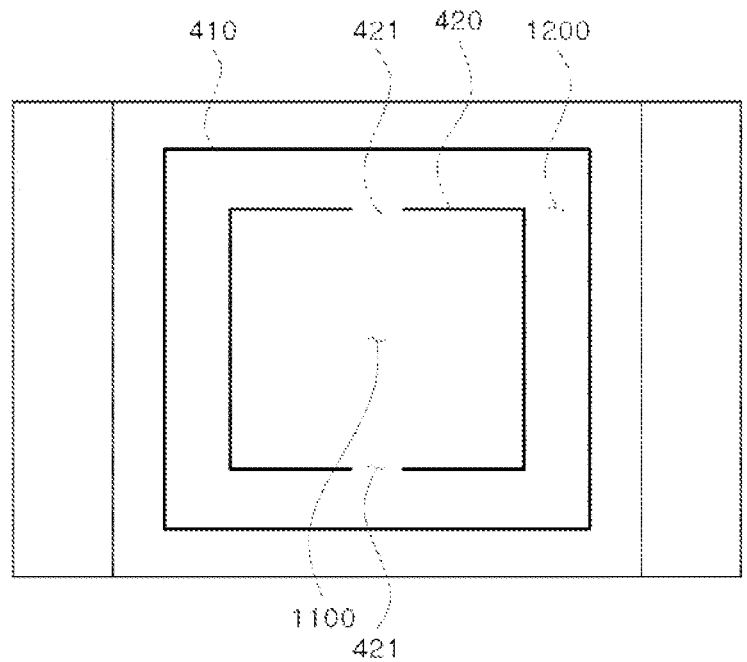
Figure 14D:
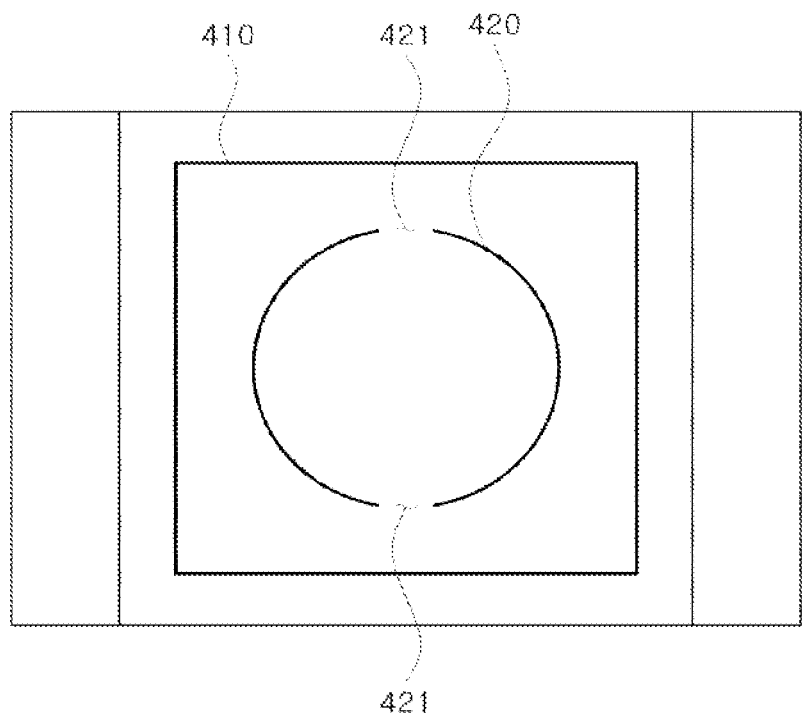

In the present embodiment, the first seal line 410 forms a closed path to suppress the leakage of the liquid crystal 300 to the outside. The second seal line 420 is provided inside the first seal line 410 and is formed as a path whose one side is open to form a sub-inlet 421. The second seal line 420 may form a rectangular path (FIGS. 14A and 14C) or a circular path (FIGS. 14B and 14D) without meeting the first seal line 410. Further, the sub inlet 421 may be formed at one side (FIGS. 14A and 14B) or a pair of sub inlets may be formed on opposite paths (FIGS. 14C and 14D).

Figure 15A:
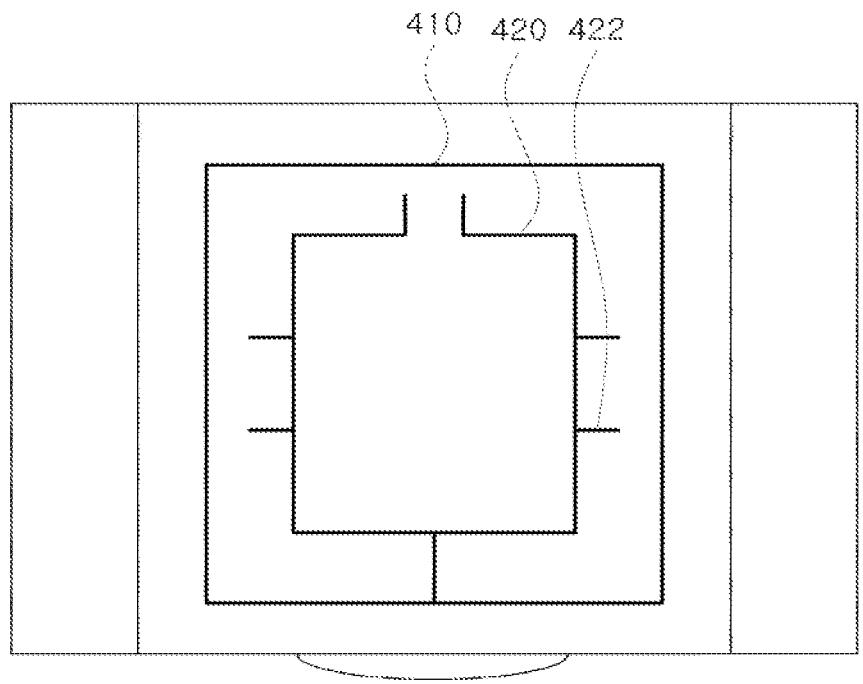
FIGS. 15A and 15B are conceptual views illustrating a modified example of the second embodiment.
Figure 15B:
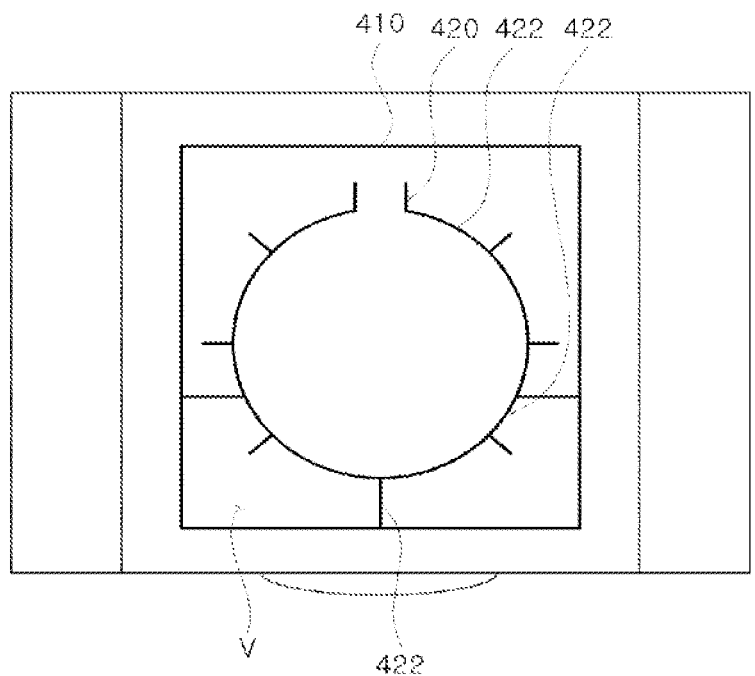

FIGS. 15A and 15B are conceptual views illustrating a modified example of the second embodiment.

Referring to FIGS. 15A and 15B, an open sub inlet 421 is formed at one side of the second seal line 420 and the seal line may include a protrusion 422 extending to the sub-liquid crystal accommodating space 1200. Further, a third seal line 430 connected to the first seal line 410 may be provided on the second seal line 420 which is opposite the sub inlet 421. The third seal line 430 is provided so that the fluid communication of the liquid crystal 300 in the sub-liquid crystal accommodating space 1200 is suppressed with the third seal line 430 as a boundary. Therefore, the liquid crystal 300 may move at both sides of the third seal line 430.

Figure 16A:
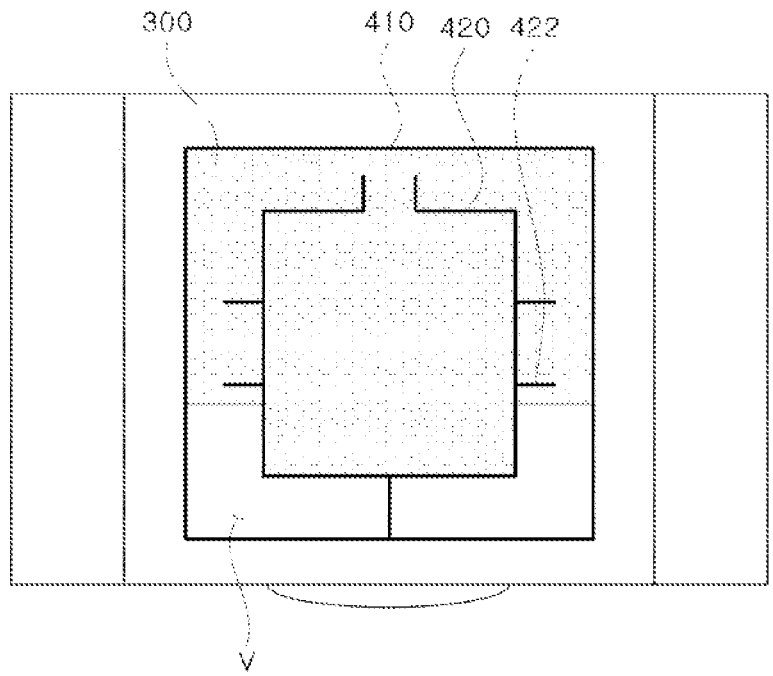
FIGS. 16A and 16B are conceptual views illustrating a liquid crystal state according to a shape of a second seal line in the second embodiment.
Figure 16B:
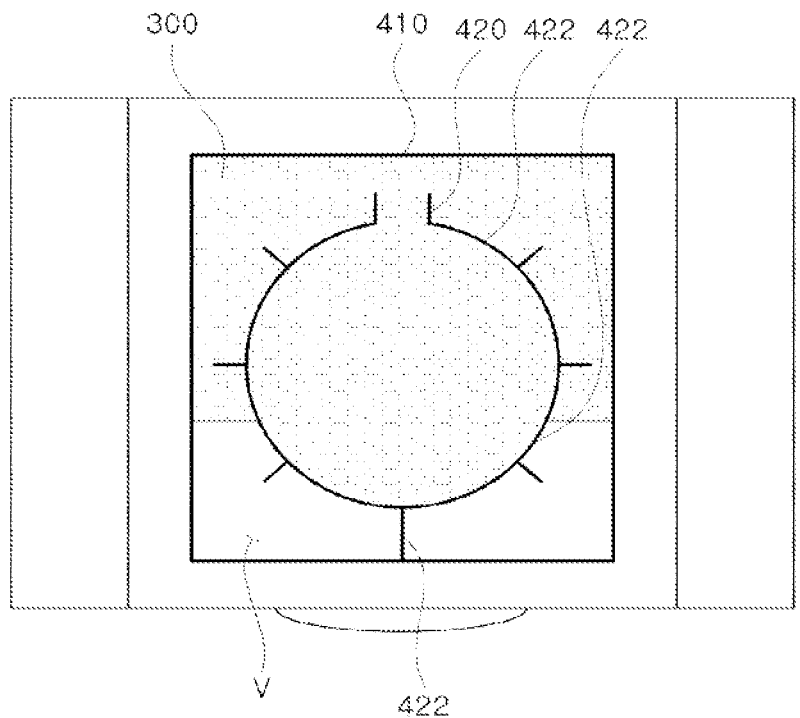

FIGS. 16A and 16B are conceptual views illustrating a liquid crystal (300) state according to the shape of the second seal line 420 in the second embodiment.

Referring to FIGS. 16A and 16B, in the present embodiment, even though a drop amount of the liquid crystal 300 is insufficient, only a part of the sub-liquid crystal accommodating space 1200 is not filled but the main liquid crystal accommodating space 1100 is fully filled with the liquid crystal 300. Therefore, a margin for the drop amount of the liquid crystal 300 is increased to improve the manufacturing process rate.

Further, also in the present embodiment, when the thermal impact or the pressure from the outside is applied, an amount of the liquid crystal 300 filled in the sub-liquid crystal accommodating space 1200 varies. However, an appropriate amount of liquid crystal 300 may be maintained in the main liquid crystal accommodating space 1100 so that even though the thermal impact or the pressure is applied, the laser filtering performance may be maintained.

FIG. 17 is a flowchart of a manufacturing method of a wavelength-tunable etalon 1 according to a third embodiment of the present disclosure, FIG. 18 is a detailed flowchart of an operation of injecting liquid crystal 300 according to the third embodiment, and FIGS. 19A to 19D are conceptual views of an operation of injecting liquid crystal 300 according to the third embodiment.

Referring to FIG. 17, a manufacturing method of a wavelength-tunable etalon 1 according to a third embodiment of the present disclosure includes an operation S100 of generating a reflection layer, an electrode 140, and an alignment layer 150 on one of the surfaces of a first substrate 100 and a second substrate, an operation S200 of applying a first seal line 410, an operation S300 of applying a second seal line 420, an operation S400 of generating a substrate assembly, an operation S500 of injecting liquid crystal 300, and an operation S600 of sealing the main inlet 411.

The operation S100 of generating a reflection layer, an electrode 140, and an alignment layer 150 on one of the surfaces of a first substrate 100 and a second substrate 200 corresponds to an operation of generating a reflection layer, an electrode 140, and an alignment layer 150 on opposite surfaces of the first substrate 100 and the second substrate 200 when the etalon 1 is assembled.

The first substrate 100 and the second substrate 200 may be simultaneously generated on one sheet and configured with the same configuration. When the first substrate 100 and the second substrate 200 are manufactured, a low reflection layer (antireflection coating) is coated on one surface of a sheet that is a base member, and a reflection coating layer (high reflection coating) may be formed first on the opposite surface.

Next, a transparent electrode 140 may be generated on the reflection coating layer. The transparent electrode 140 may be generated by a photolithographic process and may be formed using a pattern.

The alignment layer 150 covers the transparent electrode 140 and is formed as a film that is in contact with the liquid crystal (300) layer. The alignment layer 150 may be generated with an inorganic insulating layer using a shadow mask M. The alignment layer 150 may be generated using a chemical vapor deposition method (CVD), a thermal deposition method, a physical vapor deposition method (PVD), or the like. At this time, the pattern formed on the shadow mask passes through a mask and may form the alignment layer 150 in a determined area. The pattern may be determined according to a substrate arrangement which may be produced using one base material.

The operation S300 of applying the first seal line 410 corresponds to an operation of applying a seal member on the reflection coating layer of the first substrate 100 to define the liquid crystal accommodating space 1000. The first seal line 410 may be applied along a surrounding of the laser passing area L formed in the center portion of the first substrate 100. In addition, the first seal line 410 may be applied to omit a part of a path so that the main inlet 411 is formed at an outer edge of the first substrate 100.

The operation S400 of applying the second seal line 420 corresponds to an operation of applying a sealant into the liquid crystal accommodating space 1000 formed by the first seal line 410. The second seal line 420 may be formed by applying a sealant in an area excluding the sub inlet 421 spaced apart from the main inlet 411 starting from the first seal line 410 adjacent to the main inlet 411. The second seal line 420 may be applied along a rectangular path or a circular path.

The operation S500 of generating a substrate assembly corresponds to an operation of fixing the second substrate 200 to be in close contact with the first substrate 100 on which the first seal line 410 and the second seal line 420 are applied. In the meantime, a spacer or polymer beads may be mixed in the sealant, forming the first seal line 410 and the second seal line 420. When the first substrate 100 and the second substrate 200 are brought into contact with each other, a size of the polymer bead or the spacer is uniform so that a gap similar to an outer diameter may be determined between the substrates.

The operation S600 of injecting the liquid crystal 300 corresponds to an operation of injecting the liquid crystal 300 in the main liquid crystal accommodating space 1100 and the sub-liquid crystal accommodating space 1200 formed in the substrate assembly.

Referring to FIGS. 18 and 19, the operation S500 of injecting the liquid crystal 300 includes an operation S510 of exposing the substrate assembly to a vacuum state, an operation S520 of bringing the main inlet 411 into contact with an upper surface of the liquid crystal 300 accommodated in a liquid crystal (300) container, an operation S530 of releasing the vacuum state, an operation S540 of injecting the liquid crystal 300 into a liquid crystal accommodating space 1000, and an operation S550 of injecting the liquid crystal 300 into a sub-liquid crystal accommodating space 1200.

Figure 19A:
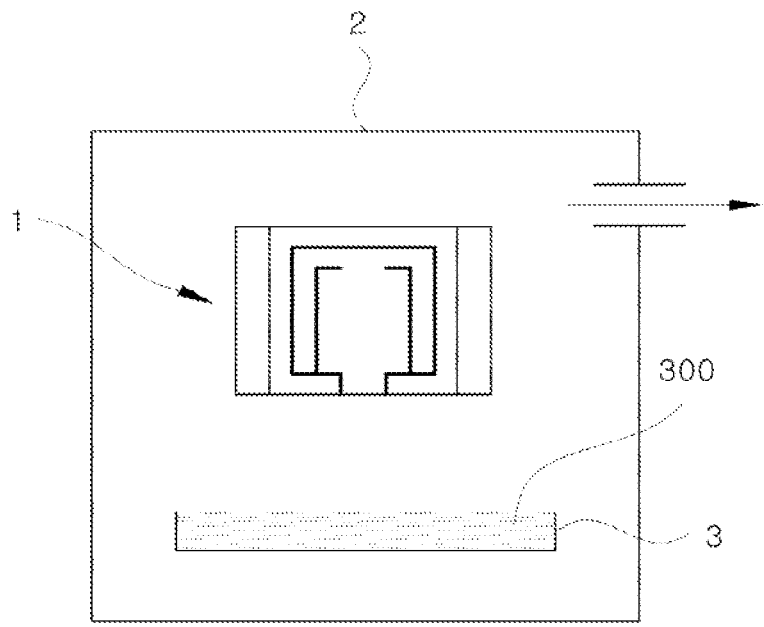
FIGS. 19A, 19B, 19C, and 19D are conceptual views of an operation of injecting liquid crystal according to the third embodiment.

Referring to FIG. 19A, the operation S510 of exposing the substrate assembly to the vacuum state corresponds to an operation of forming the atmosphere in the process chamber 2 with a vacuum. The vacuum chamber may include a substrate and a liquid crystal container 3 in which the liquid crystal 300 is stacked.

Figure 19B:
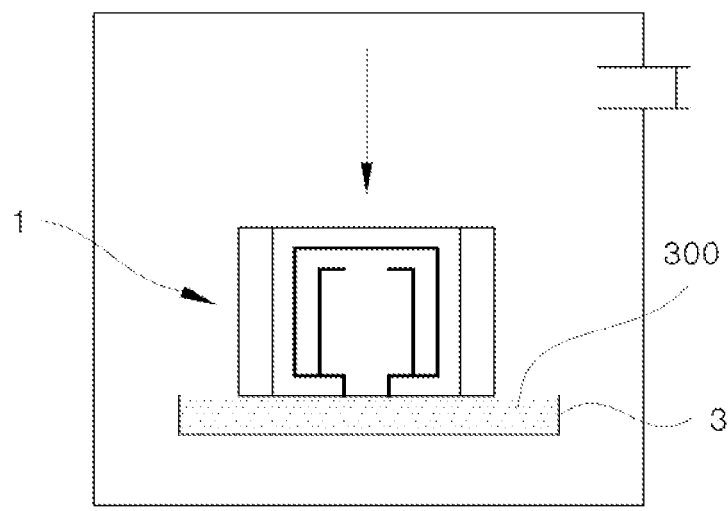

Referring to FIG. 19B, the operation S520 of bringing the main inlet 411 into contact with the upper surface of the liquid crystal 300 accommodated in the liquid crystal container 3 corresponds to an operation of allowing the main inlet 411 to approach the liquid crystal (300) container in a vacuum state and to be in contact onto a surface of the liquid crystal 300 while erecting the substrate assembly.

Figure 19C:
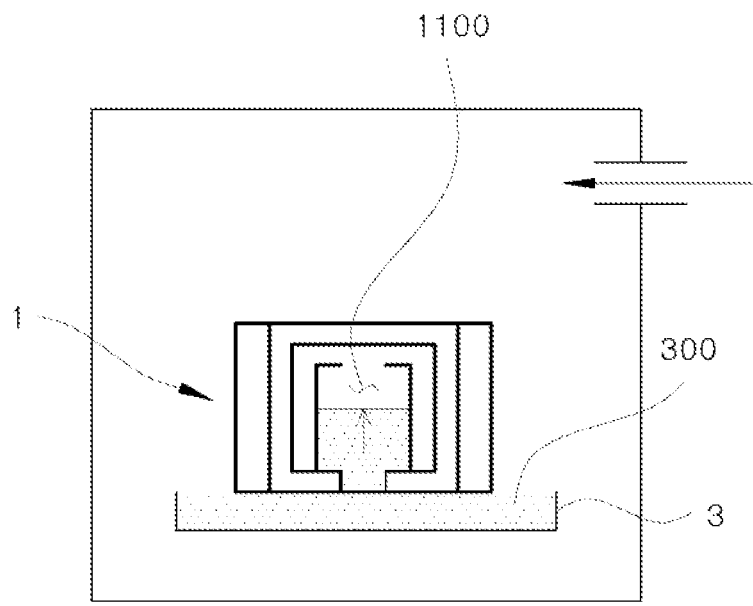

Referring to FIG. 19C, the operation S530 of releasing the vacuum state corresponds to an operation of releasing the vacuum in the process chamber to increase pressure in the vacuum chamber 2.

Figure 19D:
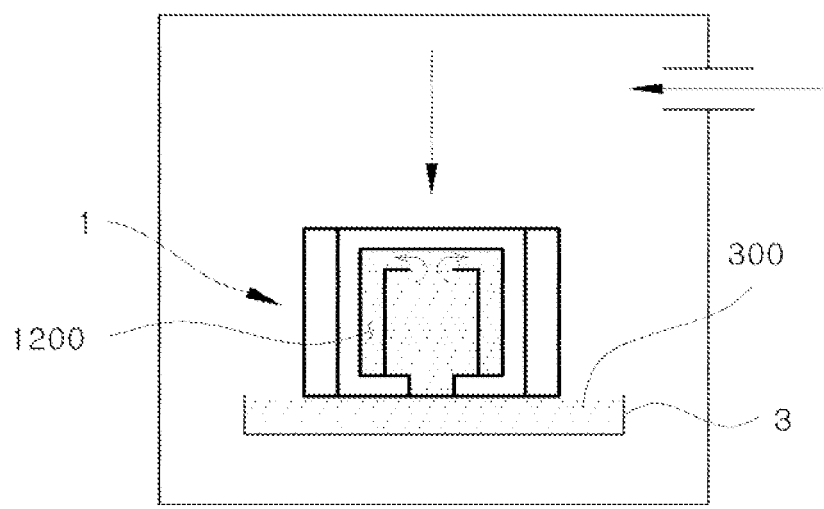

Referring to FIG. 19D, the operation S540 of injecting the liquid crystal 300 into the liquid crystal accommodating space 1000 and the operation S550 of injecting the liquid crystal 300 into the sub-liquid crystal accommodating space 1200 are an operation of naturally injecting the liquid crystal 300 into the liquid crystal accommodating space 1000 by means of the main inlet 411 as the pressure in the process chamber is increased.

The liquid crystal accommodating space 1000 seals between the first substrate 100 and the second substrate 200 by the first seal line 410 so that the liquid crystal 300 may be injected through the main inlet 411 by the pressure difference. At this time, after injecting the liquid crystal 300 into the main liquid crystal accommodating space 1100, the liquid crystal 300 is injected into the sub-liquid crystal accommodating space 1200 by means of the sub inlet 421 so that the liquid crystal 300 may be injected into the entire liquid crystal accommodating space 1000.

The operation S600 of sealing the main inlet 411 corresponds to an operation of sealing the main inlet 411 using a sealant.

In the meantime, even though not illustrated in the drawing, curing the seal line may be included. The curing operation may be performed by a sealant curing method that is widely used in the related art, such as UV.

Hereinafter, a manufacturing method of a wavelength-tunable etalon 1 according to a fourth embodiment of the present disclosure will be described in detail with reference to FIGS. 20 and 21.

Figure 20:
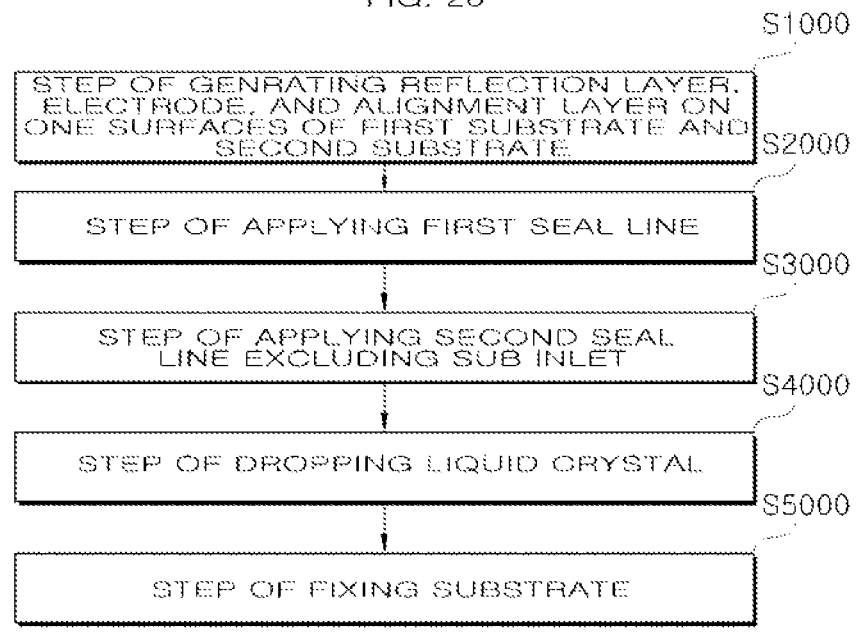
FIG. 20 is a flowchart of a wavelength-tunable etalon manufacturing method according to a fourth embodiment of the present disclosure.
Figure 21A:
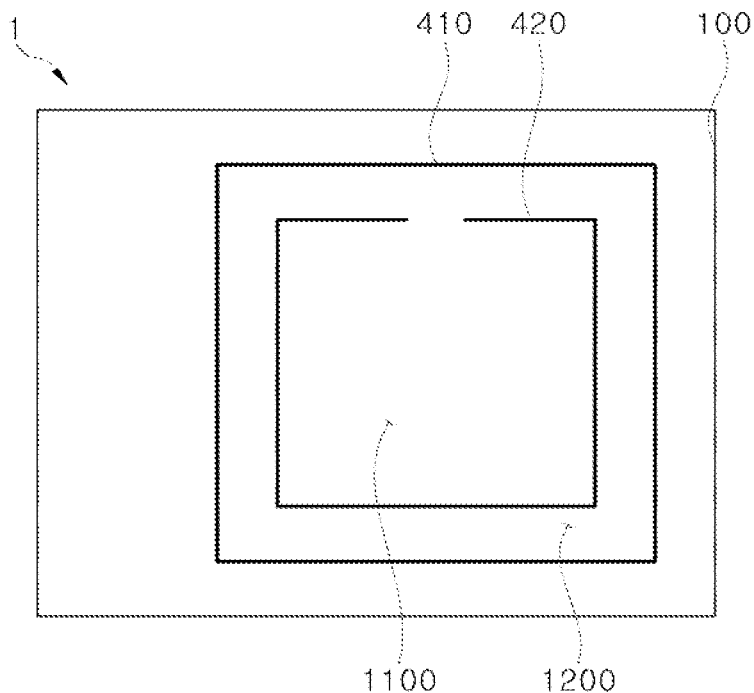
FIGS. 21A, 21B, and 21C are conceptual views of an operation of applying liquid crystal according to the fourth embodiment.
Figure 21B:
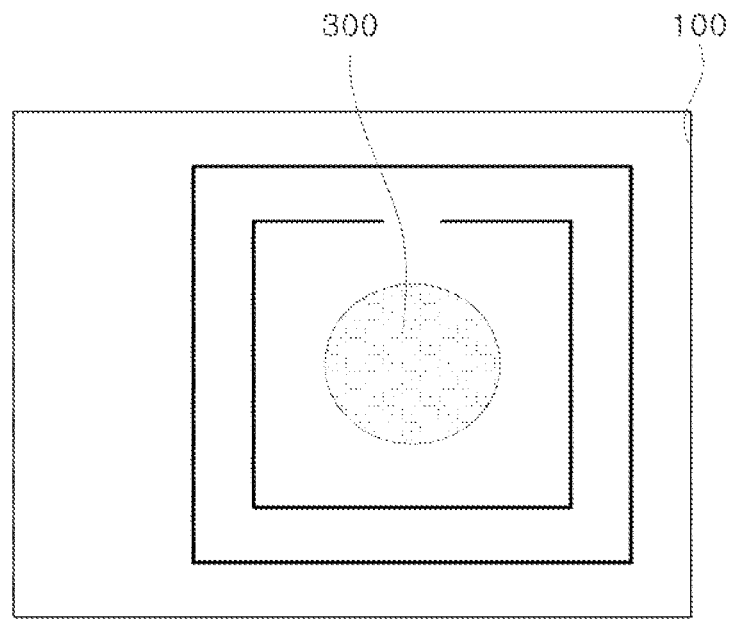
Figure 21C:
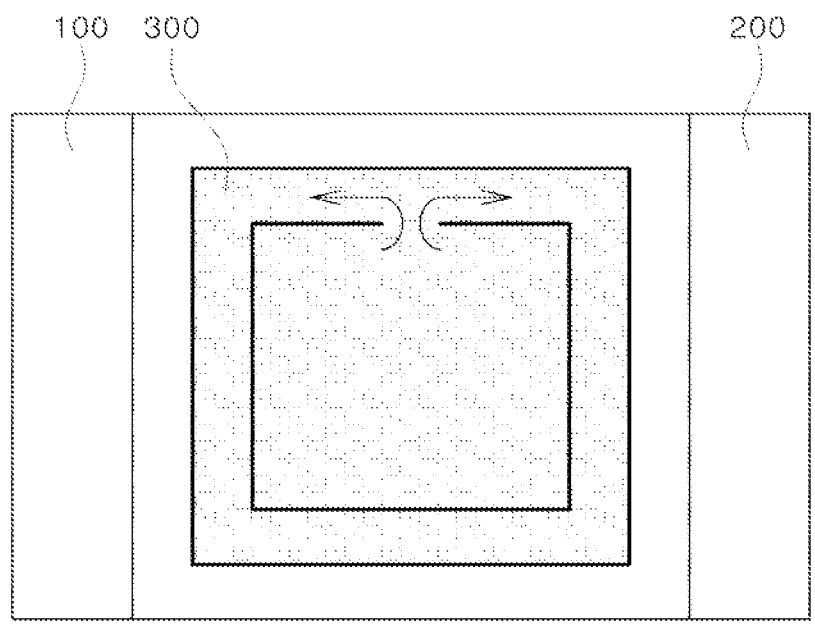

FIG. 20 is a flowchart of a manufacturing method of a wavelength-tunable etalon 1 according to a fourth embodiment of the present disclosure and FIGS. 21A to 21C are conceptual views of an operation of dropping liquid crystal 300 according to the fourth embodiment.

Referring to FIG. 20, the fourth embodiment includes an operation S1000 of generating a reflection layer, an electrode 140, and an alignment layer 150 on one of the surfaces of a first substrate 100 and a second substrate 200, an operation S2000 of applying a first seal line 410, an operation S3000 of applying a second seal line 420 excluding a sub inlet 421, an operation S4000 of dropping liquid crystal 300, and an operation S5000 of fixing the substrate.

The operation S1000 of generating a reflection layer, an electrode 140, and an alignment layer 150 on one of the surfaces of a first substrate 100 and a second substrate 200 may be performed in the same manner as in the third embodiment.

The operation S2000 of applying the first seal line 410 corresponds to applying a sealant that forms a closed path on one side surface of the first substrate 100.

The operation S3000 of applying a second seal line 420 excluding a sub inlet 421 corresponds to an operation of applying a sealant in a closed path formed by the first seal line 410 (FIG. 21A). For example, the second seal line 420 does not meet the first seal line 410 and when the second seal line 420 is formed, the second seal line may be applied to enclose a center portion to generate a laser passing area therein. However, although an example that the second seal line 420 does not meet the first seal line 410 has been described, a third seal line 430 which connects the second seal line 420 and the first seal line 410 may be further provided (not illustrated).

The operation S4000 of dropping the liquid crystal 300 corresponds to an operation of dropping the liquid crystal 300 inside the second seal line 420, that is, in the main liquid crystal accommodating space 1100 (FIG. 21B). At this time, when too much liquid crystal 300 is dropped, the substrate assembly inflates so that it is desirable to drop an appropriate amount.

In the operation S5000 of fixing the substrate, after dropping the liquid crystal 300 in the main liquid crystal accommodating space 1100, the first substrate 100 and the second substrate 200 are brought into contact with each other. At this time, when the liquid crystal 300 is fully filled in the main liquid crystal accommodating space 1100, the liquid crystal flows to the sub-liquid crystal accommodating space 1200 by means of the sub inlet 421 (FIG. 21C). Thereafter, the sealant is cured to fix the first substrate 100 and the second substrate 200.

In the present embodiment, even though the liquid crystal 300 is dropped to be more than an amount of the liquid crystal 300, which may be accommodated in the main liquid crystal accommodating space 1100, but less than an amount of the liquid crystal 300, which may be accommodated in the entire liquid crystal (300) accommodating space, an appropriate amount of liquid crystal 300 may be maintained in the main liquid crystal accommodating space 1100 by the second seal line 420. Therefore, the margin for the amount of the liquid crystal 300 is increased to improve the processability.

As described above, according to the present disclosure, the wavelength-tunable liquid crystal 300 etalon filter having a double seal line and a manufacturing method thereof may ensure robustness which may minimize a permanent deformation even by pressure and temperature changes.

Further, during a manufacturing process of a wavelength-tunable etalon filter 1, even though air bubbles or vacuum remain in a liquid crystal accommodating space 1000, the performance of the etalon 1 is maintained so that the processability may be improved.

The wavelength-tunable liquid crystal etalon filter having a double seal line and a manufacturing method thereof may ensure the robustness which may minimize permanent deformation even in a pressure and temperature change.

Further, during a manufacturing process of a wavelength-tunable etalon filter, even though air bubbles or vacuum remain in a liquid crystal accommodating space, the performance of the etalon may be maintained so that the processability may be improved.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A wavelength-tunable etalon, comprising:
a pair of substrates, each comprising a reflection layer, an electrode, and an alignment layer on opposing surfaces of the pair of substrates;
a first seal line configured to seal liquid crystal between the pair of substrates; and
a second seal line configured to divide a space in which the liquid crystal is sealed into a main liquid crystal accommodating space configured to pass laser and a sub-liquid crystal accommodating space provided external of the main liquid crystal accommodating space, wherein the second seal line comprises a sub inlet configured to fluidly communicate the main liquid crystal accommodating space with the sub-liquid crystal accommodating space, wherein even though the liquid crystal is injected, residual air or vacuum is located concentratedly at an outermost edge of the sub-liquid crystal accommodating space, and wherein an interval between the first seal line and the second seal line is larger in a space where the residual air or vacuum is located than in another space.

2. The wavelength-tunable etalon of claim 1, wherein the first seal line further comprises a main inlet configured to inject the liquid crystal into the main liquid crystal accommodating space and the sub-liquid crystal accommodating space when the pair of substrates is coupled to the first seal line.

3. The wavelength-tunable etalon of claim 2, wherein the main inlet and the sub inlet are formed in different directions at a center of a plane of the substrate.

4. The wavelength-tunable etalon of claim 3, wherein both sides of the second seal line are connected to two ends of the first seal line.

5. The wavelength-tunable etalon of claim 1, wherein the main liquid crystal accommodating space is configured to be larger than the sub-liquid crystal accommodating space.

6. The wavelength-tunable etalon of claim 1, wherein the second seal line is configured such that the main liquid crystal accommodating space has a circle, a rectangle, or a square contour.

7. The wavelength-tunable etalon of claim 1, wherein the second seal line further includes at least one protrusion extending to the sub-liquid crystal accommodating space with a predetermined length.

8. The wavelength-tunable etalon of claim 1, wherein the first seal line is configured to form a closed path.

9. The wavelength-tunable etalon of claim 8, wherein the second seal line is formed inside the first seal line without contacting the first seal line.

10. The wavelength-tunable etalon of claim 9, wherein the second seal line is configured such that the main liquid crystal accommodating space has a circle, a rectangle, or a square contour.

11. The wavelength-tunable etalon of claim 10, wherein the second seal line further includes at least one protrusion extending to the sub-liquid crystal accommodating space with a predetermined length.

12. The wavelength-tunable etalon of claim 11, further comprising a third seal line connecting one side of the second seal line and one side of the first seal line, wherein the third seal line is spaced apart from the sub inlet.

13. A manufacturing method of a wavelength-tunable etalon, comprising:
   generating a reflection layer, an electrode, and an alignment layer on a surface of a first substrate and a surface of a second substrate;
   applying a first seal line on the surface of the first substrate along a boundary of a sub-liquid crystal accommodating space excluding a main inlet;
   applying a second seal line on the surface of the first substrate along a boundary of a main liquid crystal accommodating space and the sub-liquid crystal accommodating space excluding a sub inlet within a boundary of the first seal line;
   generating a substrate assembly by aligning the second substrate and the first substrate;
   sequentially injecting liquid crystal through the main inlet into the main liquid crystal accommodating space and the sub-liquid crystal accommodating space; and
   sealing the main inlet, wherein even though the liquid crystal is injected, residual air or vacuum is located concentratedly at an outermost edge of the sub-liquid crystal accommodating space, and wherein an interval between the first seal line and the second seal line is larger in a space where the residual air or vacuum is located than in another space.

14. The manufacturing method of claim 13, wherein the sub inlet is formed spaced apart from the main inlet.

15. The manufacturing method of claim 14, wherein both sides of the second seal line are connected to ends of the first seal line adjacent to the main inlet.

16. The manufacturing method of claim 14, wherein the injecting of the liquid crystal comprises:
   exposing the substrate assembly to a vacuum state;
   bringing the main inlet into contact with an upper surface of the liquid crystal accommodated in a liquid crystal container; and
   injecting the liquid crystal into the main liquid crystal accommodating space and the sub-liquid crystal accommodating space by releasing the vacuum state.

17. The manufacturing method of claim 13, wherein the main liquid crystal accommodating space is configured to be larger than the sub-liquid crystal accommodating space.

18. The manufacturing method of claim 13, wherein the second seal line is configured such that the main liquid crystal accommodating space has a circle, a rectangle, or a square contour.

19. The manufacturing method of claim 13, wherein the second seal line further includes at least one protrusion extending to the sub-liquid crystal accommodating space with a predetermined length.

20. The manufacturing method of claim 13, wherein the first seal line is configured to form a closed path.

\* \* \* \* \*